US010327208B2

(12) United States Patent
Jeong et al.

(10) Patent No.: US 10,327,208 B2
(45) Date of Patent: Jun. 18, 2019

(54) METHOD AND APPARATUS FOR INCREASING COMMUNICATION EFFECTIVENESS OF TERMINAL IN POWER-SAVING MODE

(71) Applicant: Samsung Electronics Co., Ltd., Suwon-si, Gyeonggi-do (KR)

(72) Inventors: Sangsoo Jeong, Suwon-si (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 15/321,452

(22) PCT Filed: Jun. 30, 2015

(86) PCT No.: PCT/KR2015/006738
§ 371 (c)(1),
(2) Date: Dec. 22, 2016

(87) PCT Pub. No.: WO2016/003177
PCT Pub. Date: Jan. 7, 2016

(65) Prior Publication Data
US 2017/0164286 A1 Jun. 8, 2017

(30) Foreign Application Priority Data
Jun. 30, 2014 (KR) ........................ 10-2014-0081291

(51) Int. Cl.
*H04W 52/02* (2009.01)
*H04W 8/02* (2009.01)

(52) U.S. Cl.
CPC ......... *H04W 52/0235* (2013.01); *H04W 8/02* (2013.01); *H04W 52/0258* (2013.01); *Y02B 60/50* (2013.01); *Y02D 70/00* (2018.01)

(58) Field of Classification Search
CPC ..................... H04W 52/0235; H04W 52/0258; H04W 8/02
See application file for complete search history.

(56) References Cited

U.S. PATENT DOCUMENTS

| 2011/0170517 | A1* | 7/2011 | Bakker | ............ | H04W 36/0033 370/331 |
| 2013/0090113 | A1* | 4/2013 | Persson | ................. | H04W 24/10 455/424 |

(Continued)

FOREIGN PATENT DOCUMENTS

| KR | 10-2013-0042014 A | 4/2013 |
| WO | 2013/169376 A1 | 11/2013 |

OTHER PUBLICATIONS

3GPP TS 23.682 V122.0, Architecture enhancements to facilitate communications with packet data networks and applications (Release 12), 3GPP TSG SSA, Jun. 24, 2014.

(Continued)

*Primary Examiner* — Mohammad S Anwar
(74) *Attorney, Agent, or Firm* — Jefferson IP Law, LLP

(57) ABSTRACT

Provided are a method and apparatus for effectively exchanging information between nodes in a wireless communication system. A communication method for a user equipment (UE) may include: sending a mobility management entity (MME) a power saving mode request message containing information requesting a different network entity to perform proxy transmission and reception for the UE during power saving mode; receiving information indicating availability of power saving mode and corresponding parameters from the MME; and operating in power saving mode according to the received parameters. It is possible to provide an information transmission method for a user equipment remaining in power saving mode.

16 Claims, 13 Drawing Sheets

(56) References Cited

U.S. PATENT DOCUMENTS

| | | |
|---|---|---|
| 2013/0165101 A1 | 6/2013 | Han et al. |
| 2013/0301501 A1 | 11/2013 | Olvera-Hernandez et al. |
| 2014/0141827 A1 | 5/2014 | Park et al. |
| 2015/0063095 A1* | 3/2015 | Deng .................... H04W 76/18 370/221 |
| 2015/0103721 A1* | 4/2015 | Yi ........................... H04W 4/70 370/311 |

OTHER PUBLICATIONS

Ericsson, Power Saving Mode scope in CT1, C1-134583, 3GPP TSG-CT WG1 #85, San Francisco (CA), USA, Nov. 4, 2013.
Huawei et al., UE Power Saving Mode, S2-133648, 3GPP TSG-SA WG2 #99, Xiamen, China, Sep. 26, 2013.

* cited by examiner

METHOD AND APPARATUS FOR INCREASING COMMUNICATION EFFECTIVENESS OF TERMINAL IN POWER-SAVING MODE

TECHNICAL FIELD

The present invention relates to a method and apparatus for effectively exchanging information between nodes in a wireless communication system. More particularly, the present invention relates to a control method and apparatus that can increase effectiveness of communication when a user equipment sending and receiving messages through an operator network operates in power saving mode.

BACKGROUND ART

Typical mobile communication systems have been developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

To meet this demand, the 3rd Generation Partnership Project (3GPP) has been working to standardize technologies for various radio access networks (RAN) such as E-UTRAN, UTRAN and GERAN.

Communication systems based on 3GPP standards may support various types of services and terminals. For example, they may support not only communication terminals directly used by persons such as smartphones but also Internet of things (IoT) terminals operable with little or no human intervention. They may also support voice services, multimedia services, device management services, and communication services for delivering specific information to terminals or collecting specific information from terminals.

DISCLOSURE OF INVENTION

Technical Problem

In general, both smartphones and IoT terminals operate using batteries. Such a battery-powered terminal may operate in power saving mode to reduce power consumption. When a user equipment remains in power saving mode, although a node (e.g. server) communicating with the user equipment wishes to receive specific information from the user equipment, the user equipment remaining in power saving mode cannot send desired information. Hence, it is necessary to provide a scheme that enables a user equipment operating in power saving mode to transmit information.

A user equipment remaining in power saving mode may be unable to receive data. When a node (e.g. server) communicating with the user equipment attempts to send generated data to the user equipment remaining in power saving mode, the node may unnecessarily perform transmission attempts owing to transmission failure. Hence, it is necessary to provide a message reception control scheme for a user equipment operating in power saving mode.

When a user equipment remains in power saving mode for an extended period of time, the address (e.g. Internet Protocol (IP) address) allocated to the user equipment may be reclaimed as data transmission or reception for the user equipment does not occur for a long time. In this case, a node (e.g. server) sending and receiving data to and from the user equipment may be unaware of IP address reclamation and perform retransmission owing to transmission and reception failure. Hence, it is necessary to provide a control scheme enabling a user equipment operating in power saving mode to maintain the allocated address.

Aspects or objects of the present invention are not limited to those described above. Other aspects, advantages, and salient features of the present invention will become apparent to those skilled in the art from the following description.

Solution to Problem

In accordance with an aspect of the present invention, there is provided a method of communication for a user equipment (UE). The method may include: sending a mobility management entity (MME) a power saving mode request message containing information requesting a different network entity to perform proxy transmission and reception for the UE during power saving mode; receiving information indicating availability of power saving mode and corresponding parameters from the MME; and operating in power saving mode according to the received parameters.

The power saving mode request message may contain information regarding at least one of the time duration in which the UE remains in power saving mode, an active timer, and an active flag.

The method may further include sending the different network entity information that is to be transmitted by the different network entity while the UE remains in power saving mode.

In accordance with another aspect of the present invention, there is provided a method of communication for a mobility management entity (MME). The method may include: receiving, from a user equipment (UE), a power saving mode request message containing information requesting a different network entity to perform proxy transmission and reception for the UE in power saving mode; sending information indicating availability of power saving mode and corresponding parameters to the UE; and sending a home subscriber server (HSS) information requesting a different network entity to perform proxy transmission and reception for the UE during power saving mode.

In accordance with another aspect of the present invention, there is provided a method of communication for a service capability server (SCS). The method may include: receiving, from a user equipment (UE), information requesting proxy transmission and reception for the UE in power saving mode; and sending and receiving a message to and from a server on behalf of the UE while the UE remains in power saving mode.

Sending and receiving a message to and from a server may include sending the server a message whose source address or external ID is set to the address or external ID of the UE.

In accordance with another aspect of the present invention, there is provided a user equipment (UE). The user equipment may include: a communicator to send and receive signals to and from a different network entity; and a controller to control a process of sending a mobility management entity (MME) a power saving mode request message containing information requesting a different network entity to perform proxy transmission and reception for the UE during power saving mode, receiving information indicating availability of power saving mode and corresponding parameters from the MME, and operating in power saving mode according to the received parameters.

In accordance with another aspect of the present invention, there is provided a mobility management entity (MME). The mobility management entity may include: a communicator to send and receive signals to and from a different network entity; and a controller to control a process of receiving, from a user equipment (UE), a power saving mode request message containing information requesting a different network entity to perform proxy transmission and reception for the UE in power saving mode, sending information indicating availability of power saving mode and corresponding parameters to the UE, and sending a home subscriber server (HSS) information requesting a different network entity to perform proxy transmission and reception for the UE during power saving mode.

In accordance with another aspect of the present invention, there is provided a service capability server (SCS). The service capability server may include: a communicator to send and receive signals to and from a different network entity; and a controller to control a process of receiving, from a user equipment (UE), information requesting proxy transmission and reception for the UE in power saving mode, and sending and receiving a message to and from a server on behalf of the UE while the UE remains in power saving mode.

Advantageous Effects of Invention

In a feature of the present invention, there is provided an information transmission method for a user equipment operating in power saving mode.

In another feature of the present invention, there is provided a message reception control method for a user equipment operating in power saving mode.

In another feature of the present invention, there is provided a control method enabling a user equipment remaining in power saving mode to maintain the allocated address.

Advantages or features of the present invention are not limited to those described above. Other aspects, advantages, and salient features of the present invention will become apparent to those skilled in the art from the following detailed description.

Other effects or advantages will be explicitly or implicitly disclosed in the following detailed description of embodiments of the present invention.

MODE FOR THE INVENTION

Figure 1:
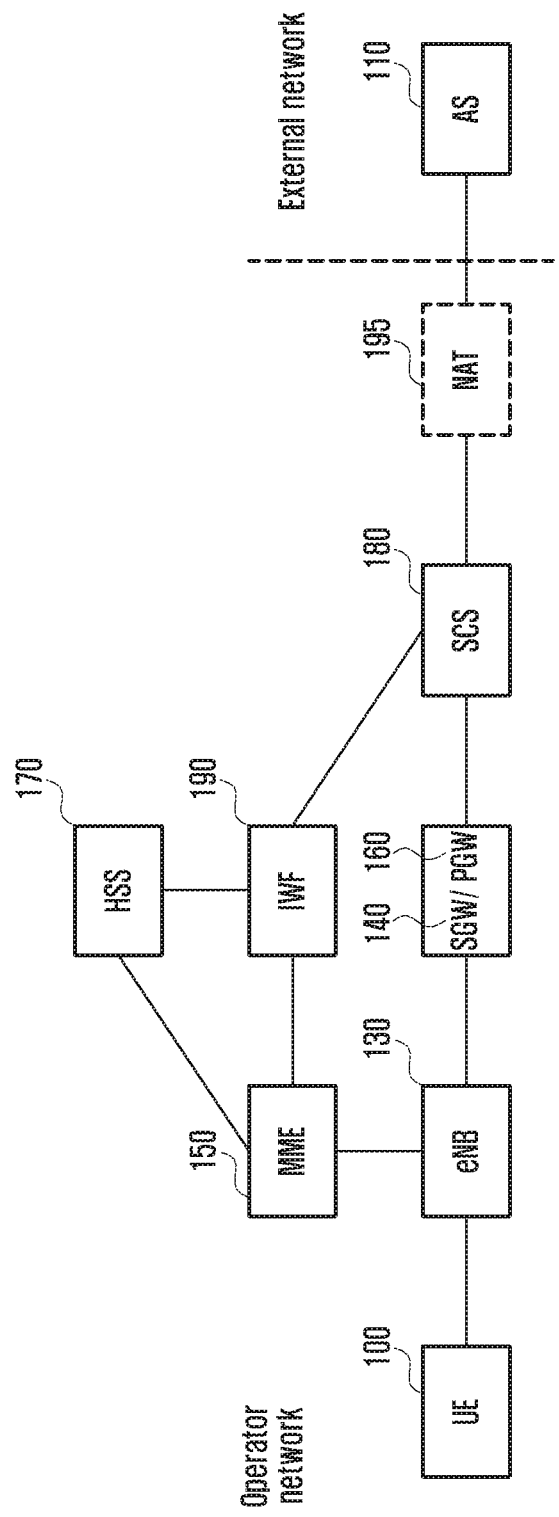
FIG. 1 illustrates the architecture of a communication system according to an embodiment of the present invention.

Hereinafter, embodiments of the present invention are described in detail with reference to the accompanying drawings.

Descriptions of functions and structures well known in the art and not directly related to the present invention may be omitted to avoid obscuring the subject matter of the present invention. The terms and words used in the following description are not limited to the bibliographical meanings, but, are merely used by the inventor to enable a clear and consistent understanding of the present invention. Hence, these terms should be interpreted as having a meaning that is consistent with their meaning in the context of the specification and relevant art.

In the drawings, some elements are exaggerated, omitted, or only outlined in brief, and thus may be not drawn to scale. The same or similar reference symbols are used throughout the drawings to refer to the same or like parts.

The aspects, features and advantages of certain embodiments of the present invention will be more apparent from the following detailed description taken in conjunction with the accompanying drawings. The description of the various embodiments is to be construed as exemplary only and does not describe every possible instance of the present invention. It should be apparent to those skilled in the art that the following description of various embodiments of the present invention is provided for illustration purpose only and not for the purpose of limiting the present invention as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

Descriptions of well-known functions and structures incorporated herein may be omitted to avoid obscuring the subject matter of the present invention.

The following description is focused on 3GPP LTE systems. However, it should be understood by those skilled in the art that the subject matter of the present invention is applicable to other communication/computer systems having similar technical backgrounds and system configurations without departing from the scope of the present invention.

For example, the description related to the LTE system may be applied to the UTRAN/GERAN system having similar system architecture. In this case, the ENB (RAN node) may be replaced with the RNC/BSC, the SGW may be omitted or be included in the SGSN, and the PGW may correspond to the GGSN. The MME may correspond to the SGSN. Bearers in the LTE system may correspond to PDP contexts in the UTRAN/GERAN system.

In the following description of embodiments, the message service is used as a main target service. However, it should be understood by those skilled in the art that embodiments of the present invention are also applicable to other communication services such as IP-based data communication services and short message services without departing from the scope of the present invention. Hence, in the description of embodiments of the present invention, the word "message" may be used interchangeably with "data", "information", "packet" or the like.

FIG. 1 illustrates the architecture of a communication system according to an embodiment of the present invention. In embodiments, the communication system may be an LTE-based mobile communication system.

Referring to FIG. 1, the radio access network (EUTRAN) of the LTE mobile communication system is composed of an evolved base station (Evolved Node B, ENB or Node B) 130, Mobility Management Entity (MME) 150, and Serving Gateway (SGW) 140.

A user equipment (UE or terminal) 100 may connect to an external network through the ENB 130, SGW 140 and Packet Data Network (PDN) Gateway (PGW) 160. A PDN connection is to be established to enable the UE 100 to send and receive data through the PGW 160. One PDN connection may include one or more EPS bearers.

Application Server (AS) 110 is an entity that provides application level information to user applications. The AS 110 may be referred to as a server in a typical service model, and may correspond to Application Function (AF).

Although not shown, Policy and Charging Rules Function (PCRF) is an entity controlling QoS (quality of service) policies for a user. Policy and charging control (PCC) rules corresponding to a specific policy are sent to the PGW 160 for enforcement.

The ENB 130 is a radio access network (RAN) node, which corresponds to Radio Network Controller (RNC) of the UTRAN (Universal Terrestrial Radio Access Network) system or Base Station Controller (BSC) of the GERAN (GSM EDGE Radio Access Network) system. The ENB 130 is connected with the UE 100 through a wireless channel and functions similarly to the existing RNC or BSC.

In the LTE system, as all user traffic including real-time services like VoIP (Voice over IP) services is served by shared channels, it is necessary to perform scheduling on the basis of status information collected from UEs 100. The ENB 130 performs this scheduling function.

The SGW 140 provides data bearers, and may create and remove a data bearer under the control of the MME 150.

The MME 150 performs various control functions, and may be connected to multiple ENBs.

Home Subscriber Server (HSS) 170 is a node storing subscription data for users.

Service Capability Server (SCS) 180 is a node residing between the AS 110 and the operator network to increase the added value of a service that is provided by the AS 110 to a user through the operator network. The SCS raising the value of an IoT (Internet of Things) service (or Machine Type Communication (MTC) service) may be referred to as IoT-SCS (or MTC-SCS). The SCS, which provides a proxy function by sending and receiving messages on behalf of a UE, may be referred to as SCS-Proxy. Such names may be used in embodiments of the present invention for ease of description based on functionality. This naming convention may be applied to any type of server that is adapted to a specific service (e.g. communication service using IoT or MTC communication) and assists the service, raises the quality of the service, or controls the service according to operator settings.

Interworking Function (IWF) 190 may perform protocol conversion or data processing between communication nodes/servers. The IWF used in an IoT (or MTC) environment may be referred to as IoT-IWF (or MTC-IWF).

Network Address Translation (NAT) 195 is an entity that converts or maps IP addresses between internal and external operator networks.

Although not shown, the communication system may include Mobile Switching Center (MSC) and Gateway Mobile Switching Center (GMSC). The GMSC is a gateway to the operator network for circuit switched (CS) services such as voice service and short messaging service (SMS). The MSC is a controller for the CS domain.

Next, a description is given of a scheme whereby, when a server requests a user equipment operating in power saving mode to send information (or message), a different network entity sends information of the user equipment on behalf of the user equipment to thereby permit the user equipment to remain in power saving mode.

Figure 2:
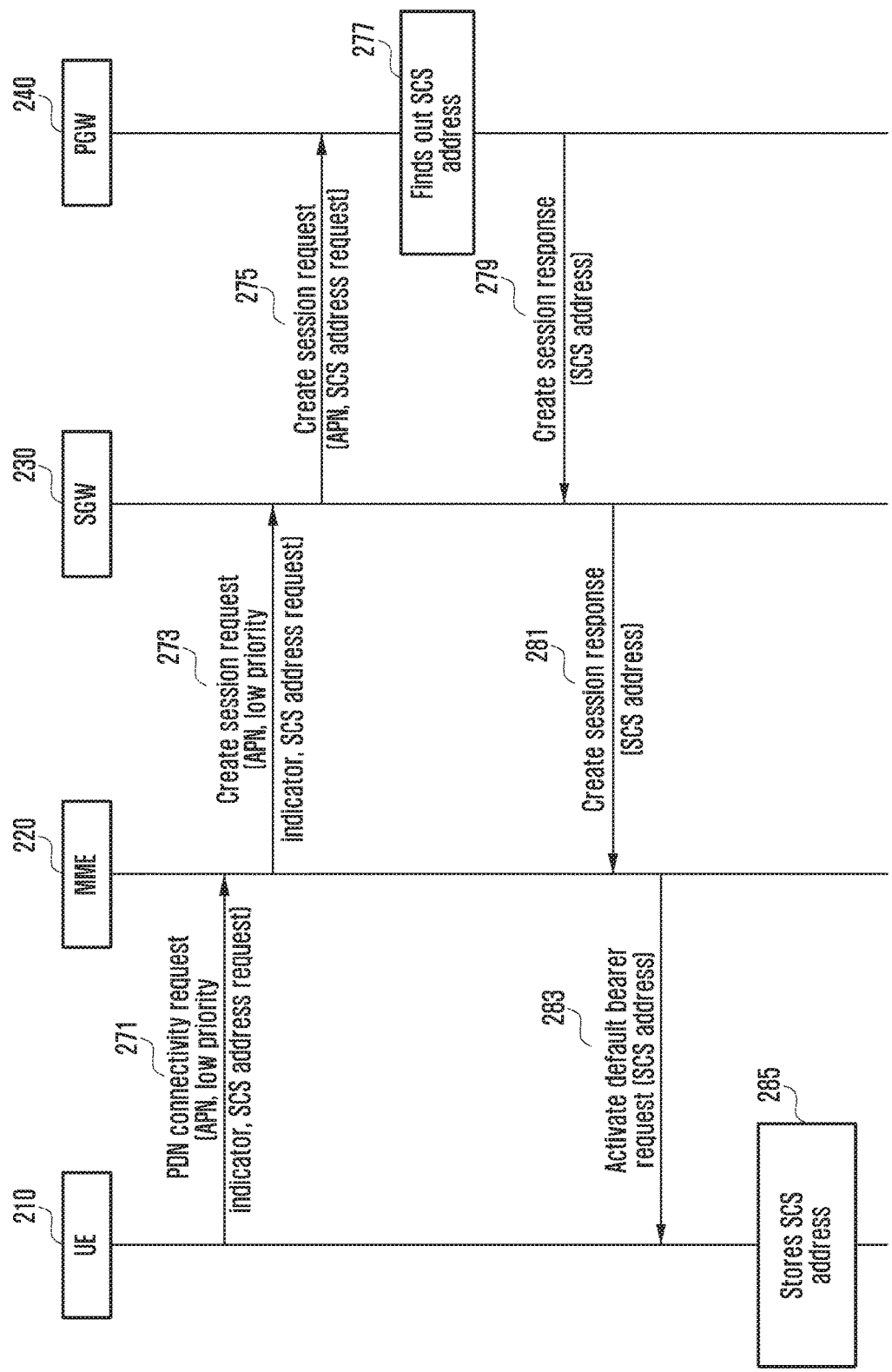
FIG. 2 is a sequence diagram depicting a procedure for exchanging an SCS address between a user equipment and the network according to an embodiment of the present invention.

FIG. 2 is a sequence diagram depicting a procedure for exchanging an SCS address between a user equipment and the network according to an embodiment of the present invention.

Referring to FIG. 2, at step 271, the UE 210 sends a PDN connection setup request message (e.g. PDN connectivity request) to the MME 220. During an attach procedure, this request message may be contained and transmitted in an attach message. The PDN connection setup request message may contain at least one of APN (access point name), indicator for low priority or low sensitivity to transmission delay, and SCS address request. In one embodiment, the SCS address request may be contained and transmitted in Protocol Configuration Option (PCO).

At step 273, the MME 220 sends a message (e.g. Create Session Request) containing APN and SCS address request to the SGW 230. When the SCS address request is received from the UE 210 in the form of a PCO, the MME 220 may insert the received PCO as it is in the message to be sent to the SGW 230.

At step 275, the SGW 230 generates a create session request message on the basis of the information received from the MME 220 and sends the create session request message to the PGW 240. That is, the information received from the MME 220 may be forwarded by the SGW 230 to the PGW 240.

When the request message received from the SGW 230 contains an SCS address request made by the UE 210, at step 277, the PGW 240 identifies the SCS address to be notified to the UE 210. The SCS address may be determined on the basis of APN or basic QoS information of the UE 210 associated with the current connection. To identify the SCS address, the PGW 240 may make a DNS query or exchange information with different network nodes.

At step 279, the PGW 240 sends a message (e.g. Create Session Response) containing the identified SCS address to the SGW 230. In one embodiment, the identified SCS address may be contained in the PCO for transmission.

At step 281, the SGW 230 sends a message (e.g. Create Session Response) to the MME 220 on the basis of the information received from the PGW 240. Here, the message may include the SCS address or a PCO having the SCS address.

At step 283, the MME 220 sends the UE 210 a message (e.g. Activate Default Bearer Request) containing the SCS address received from the SGW 230. When the SCS address is received from the SGW 230 in the form of a PCO, the MME 220 may insert the received PCO as it is in the message to be sent to the UE 210.

At step 285, the UE 210 extracts the SCS address from the received message and stores the SCS address. Thereafter, the UE 210 may use the stored SCS address to utilize an SCS function for message transmission and reception.

Figure 3:
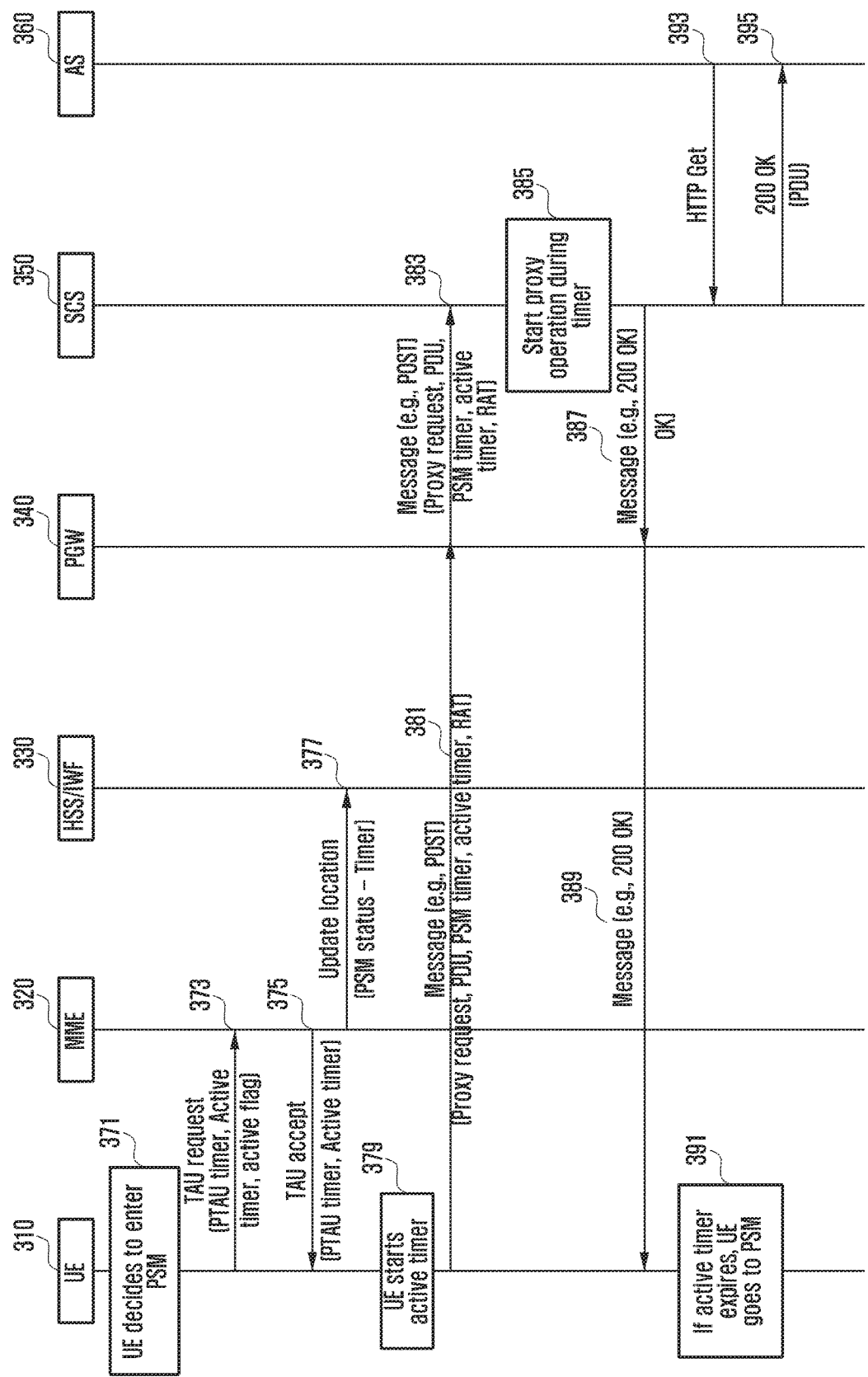
FIG. 3 is a sequence diagram depicting a procedure of the communication system to send a message for a user equipment operating in power saving mode according to an embodiment of the present invention.

FIG. 3 is a sequence diagram depicting a procedure of the communication system to send a message for a user equipment operating in power saving mode according to an embodiment of the present invention.

Referring to FIG. 3, at step 371, the UE 310 determines to enter power saving mode (PSM) in consideration of terminal states, service application requests, and configuration information.

To enter power saving mode, at step 373, the UE 310 sends a tracking area (TA) update request message to the MME 320. The TA update request message may contain at least one of periodic TAU timer value, active timer value, and active flag, if necessary. The periodic TAU timer value indicates the time to the next TAU, and may indicate the duration in which the UE 310 remains in power saving mode in embodiments of the present invention. When the UE 310 has a message to be sent before entering power saving mode, the TA update request message may be sent with the active flag set. In one embodiment, the UE 310 may insert information that explicitly requests the network to perform message transmission on behalf of the UE 310 (proxy transmission request) in the TA update request message. In one embodiment, the UE 310 may insert an indicator for low priority or low sensitivity to transmission delay in the TA update request message.

Upon reception of the TA update request from the UE 310, the MME 320 may determine whether to allow power saving mode and corresponding parameters (e.g. periodic TAU timer value and active timer value). At step 375, the MME 320 sends a TA update accept message containing the determination result to the UE 310. The periodic TAU timer indicates the time to the next TAU and indicates the duration in which the UE 310 remains in power saving mode. The MME 320 may determine whether to enable the network to perform message transmission on behalf of the UE 310 on the basis of requests from the UE 310 (e.g. indicator for low priority or low sensitivity to transmission delay), characteristics of the PDN connection associated with the UE 310 (e.g. APN and ARP), internal settings of the UE 310, and subscription information of the UE 310. In one embodiment, the MME 320 may explicitly insert the determination result in the TA update accept message.

Thereafter, at step 379, the UE 310 extracts necessary parameters from the TA update accept message and prepares for entering power saving mode according to the parameters. In particular, the UE 310 may start the active timer and wait for expiration of the active timer without entering power saving mode.

Meanwhile, at step 377, the MME 320 notifies the HSS or IWF 330 that the UE 310 has transitioned to power saving mode. The MME 320 may also notify the HSS/IWF 330 of the duration in which the UE 310 remains in power saving mode.

The UE 310 may determine whether to request the network to perform message transmission on behalf of the UE 310 (i.e. whether to make a proxy transmission request) in response to a data transmission request from a server (or external network) during power saving mode. The UE 310 may perform this determination on the basis of internal configuration information, or information contained in the TA update accept message or attach accept message received earlier (e.g. information on whether the network supports proxy transmission for a specific UE).

Upon determining to make a proxy transmission request, when there is a message to be sent, at step 381, the UE 310 sends the message to the SCS 350 before expiration of the active timer. The message may be an IP based message. More specifically, the message may be a message using the CoAP, MQTT, XMPP, or HTTP protocol. The message may have, for example, "POST" as transmission code or cause. The message may include at least one of information indicating that the UE 310 operates in power saving mode, information indicating the duration of power saving mode, information indicating proxy transmission, information indicating the radio access technology (RAT) to which the UE 310 is connected (e.g. E-UTRAN, UTRAN or GERAN), and message payload (PDU). The message may include an active timer value. In one embodiment, at step 383, the message may be forwarded through the PGW 340 to the SCS 350. The destination address of the message may be set to the previously received address of the SCS 350. In one embodiment, the UE 310 may insert its external ID in the message to be sent to the SCS 350. Meanwhile, to determine whether to request the network to perform proxy transmission during power saving mode, the UE 310 may use information of the RAT to which it is connected. In particular, the UE 310 may make a proxy transmission request only when it is using a specific RAT (e.g. GERAN with a low transfer rate).

The SCS 350 may receive a message from the UE 310 at step 381 (and at step 383). When an active timer value is contained in the received message, at step 385, the SCS 350 starts the active timer.

According to the message received at step 381 (and at step 383), the SCS 350 may be aware that the UE 310 operates in power saving mode and it has to perform message transmission on behalf of the UE 310. When the time duration for power saving mode is contained in the received message, the SCS 350 may perform message transmission on behalf of the UE 310 for the time duration by assuming that the UE 310 remains in power saving mode for the indicated time duration unless a separate message is received from the UE 310. When an active timer value is contained in the received message, the SCS 350 may start to perform message transmission on behalf of the UE 310 upon expiration of the active timer. In one embodiment, to distinguish the UE 310 from an actual server, the SCS 350 may extract not only the source IP address and port but also the destination IP address and port from the message sent by the UE 310 and store the extracted address information. When the received message contains the external ID of the UE 310, the SCS 350 may store the external ID. Meanwhile, to determine whether to perform the above operation, the SCS 350 may refer to the information on the RAT to which the UE 310 is connected. In particular, the SCS 350 may perform the above operation only when the UE 310 is using a specific RAT (e.g. GERAN with a low transfer rate). The SCS 350 may determine whether to apply protocol translation on the basis of the type of the RAT to which the UE 310 is connected (e.g. convert a CoAP message sent by the UE 310 to a HTTP message, or convert a HTTP message to be sent to the UE 310 to a CoAP message).

Thereafter, at step 387, the SCS 350 sends a message indicating message reception to the UE 310. The message may use the same protocol as used for the corresponding message received from the UE 310 and may have, for example, "200 OK" as transmission code or cause. In one embodiment, the message may be forwarded through the PGW 340 to the UE 310 (step 389).

When the active timer expires, at step 391, the UE 310 enters power saving mode.

Later, at step 393, the SCS 350 receives a message requesting the UE 310 to send data from a server. The message may be an IP based message. More specifically, the message may be a message using the CoAP, MQTT, XMPP, or HTTP protocol. The message may have, for example, "GET" as transmission code or cause. The SCS 350 may compare the destination address (IP address and port) or external ID of the received message with the stored information to find a matching UE (e.g. UE 310). When a matching UE (UE 310) is found, the SCS 350 may be aware that it has to respond to the received message on behalf of the UE 310 remaining in power saving mode.

At step 395, the SCS 350 sends a response message on behalf of the UE 310. The response message may be an IP based message. More specifically, the response message may be a message using the CoAP, MQTT, XMPP, or HTTP protocol. The response message may have, for example, "200 OK" as transmission code or cause. The response message may contain the data or message having been received from the UE 310 for proxy transmission. In one embodiment, the source address or external ID of the message may be set to the address or external ID of the UE 310 (not the SCS 350). If the protocol used for the message having been sent by the UE 310 (e.g. CoAP protocol) is different from that used by the server (e.g. HTTP protocol), the SCS 350 may perform protocol translation.

In the above embodiment, the UE 310 is described as entering power saving mode after being attached to the network (i.e. TA update). However, the above operations may be applied when the UE 310 performs the attach procedure. When the above embodiment is applied while the attach procedure is in progress, the TA update request message and the TAU accept message may be replaced with the attach request message and the attach accept message, respectively.

Figure 4:
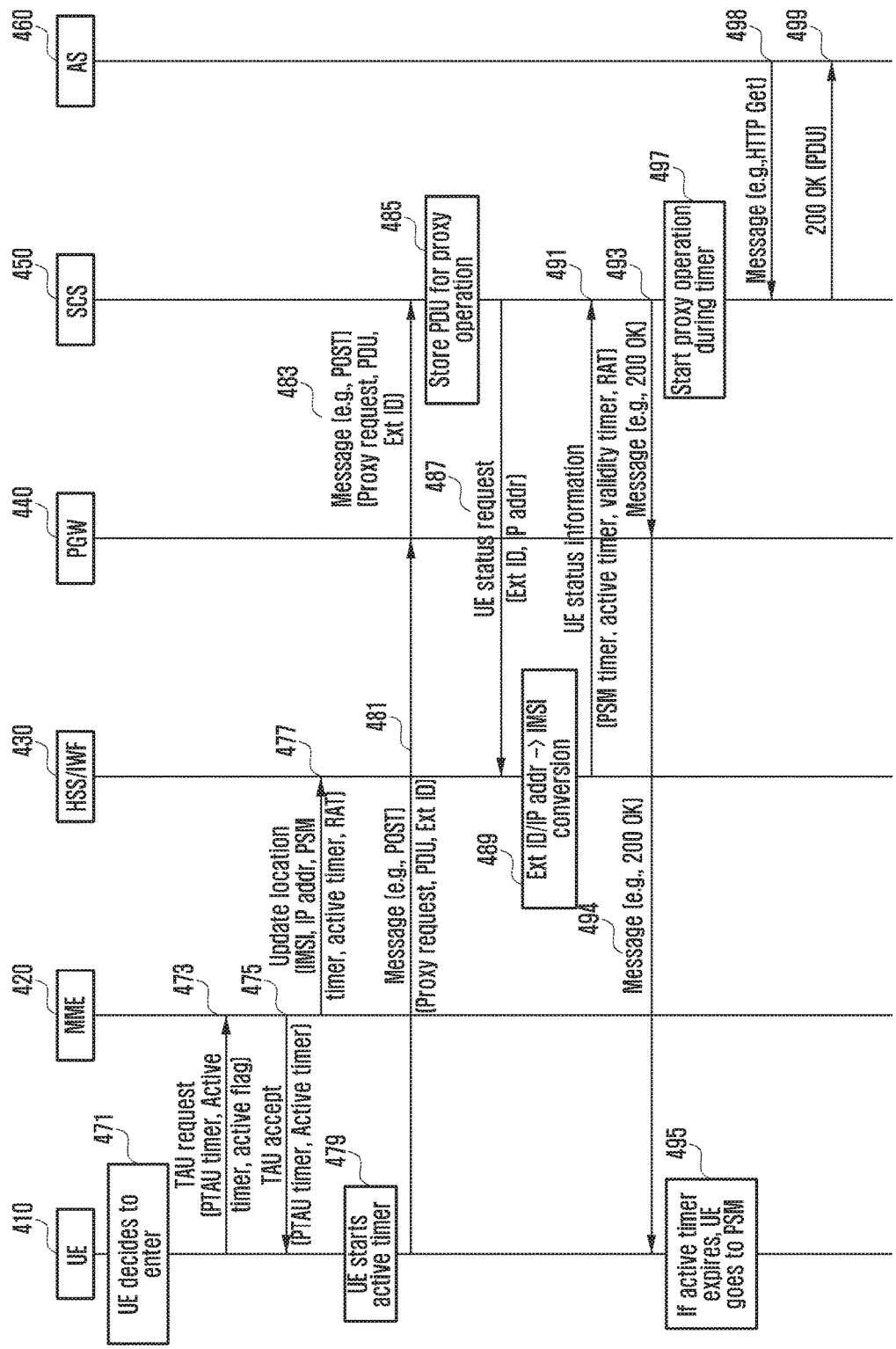
FIG. 4 is a sequence diagram depicting a procedure of the communication system to send a message for a user equipment operating in power saving mode according to another embodiment of the present invention.

FIG. 4 is a sequence diagram depicting a procedure of the communication system to send a message for a user equipment operating in power saving mode according to another embodiment of the present invention.

Referring to FIG. 4, at step 471, the UE 410 determines to enter power saving mode in consideration of terminal states, service application requests, and configuration information.

To enter power saving mode, at step 473, the UE 410 sends a TA update request message to the MME 420. The TA update request message may contain at least one of periodic TAU timer value, active timer value, and active flag, if necessary. When the UE 410 has a message to be sent before entering power saving mode, the TA update request message may be sent with the active flag set. In one embodiment, the UE 410 may insert information that explicitly requests the network to perform message transmission on behalf of the UE 410 (proxy transmission request) in the TA update request message. In one embodiment, the UE 410 may insert an indicator for low priority or low sensitivity to transmission delay in the TA update request message.

Upon reception of the TA update request from the UE 410, the MME 420 may determine whether to allow power saving mode and corresponding parameters (e.g. periodic TAU timer value and active timer value). At step 475, the MME 420 sends a TA update accept message containing the determination result to the UE 410. The MME 420 may determine whether to enable the network to perform proxy transmission for the UE 410 on the basis of requests from the UE 410 (e.g. indicator for low priority or low sensitivity to transmission delay), characteristics of the PDN connection associated with the UE 410 (e.g. APN and ARP), internal settings of the UE 410, and subscription information of the UE 410. In one embodiment, the MME 420 may explicitly insert the determination result in the TA update accept message.

Thereafter, at step 479, the UE 410 extracts necessary parameters from the TA update accept message and prepares for entering power saving mode according to the parameters. In particular, the UE 410 may start the active timer and wait for expiration of the active timer without entering power saving mode.

Meanwhile, at step 477, the MME 420 notifies the HSS or IWF 430 that the UE 410 has transitioned to power saving mode. In one embodiment, the MME 420 may also send the HSS/IWF 430 information regarding at least one of the identifier of the UE 410, the IP address thereof, the RAT to which the UE 410 is attached, the duration in which the UE 410 remains in power saving mode, and the active timer value. The HSS/IWF 430 stores the information received from the MME 420. Later, when information on the UE 410 is requested by the SCS 450 or when the state of the UE 410 changes, the HSS/IWF 430 may send at least a portion of the stored information to the SCS 450.

The UE 410 may determine whether to request the network to perform message transmission on behalf of the UE 410 (i.e. whether to make a proxy transmission request) in response to a data transmission request from a server (or external network) during power saving mode. The UE 410 may perform this determination on the basis of internal configuration information, or information contained in the TA update accept message or attach accept message received earlier (e.g. information on whether the network supports proxy transmission for a specific UE).

Upon determining to make a proxy transmission request, when there is a message to be sent, at step 481, the UE 410 sends the message to the SCS 450 before expiration of the active timer. The message may be an IP based message. More specifically, the message may be a message using the CoAP, MQTT, XMPP, or HTTP protocol. The message may have, for example, "POST" as transmission code or cause. The message may include at least one of information indicating proxy transmission, message payload (PDU), and external ID of the UE 410. In one embodiment, at step 481, the message may be forwarded through the PGW 440 to the SCS 450. The destination address of the message may be set to the previously received address of the SCS 450. At step 485, the SCS 450 stores information contained in the message received from the UE 410.

As described above, the SCS 450 may receive a message from the UE 410 at step 481 (and at step 483).

At step 487, to check status information of the UE 410, the SCS 450 sends a status request message for the UE 410 to the HSS/IWF 430. In one embodiment, step 487 may be performed when status information of the UE 410 is not stored in the SCS 450 or when the validity timer for the status information of the UE 410 has expired. The status request message may contain the external ID and/or IP address of the UE 410.

Upon reception of the status request message from the SCS 450, at step 489, the HSS/IWF 430 derives status information of the UE 410 by using the address information of the received message. For example, the HSS/IWF 430 may map the external ID and/or IP address received from the SCS 450 to a 3GPP specific identifier (e.g. IMSI) and obtain status information of the UE 410 using the 3GPP specific identifier.

At step 491, the HSS/IWF 430 sends a message containing the status information of the UE 410 to the SCS 450. The message may include information regarding at least one of the external ID of the UE 410, the IP address of the UE 410, the current state of the UE 410 (power saving mode or not), the RAT to which the UE 410 is attached, and the timer indicating the duration of power saving mode (e.g. periodic TAU timer). The message may include information indicating proxy transmission for the UE 410 during power saving mode. The message may include an active timer value. When an active timer value is contained in the received message, the SCS 450 may start the active timer and initiate proxy transmission for the UE 410 upon expiration of the active timer. The message may contain a validity timer value, which indicates the duration in which the status information of the UE 410 contained in the message is valid. The SCS 450 stores these information items contained in the received message and may be aware of the current state of the UE 410 and the duration of power saving mode on the basis of the information items.

Meanwhile, to determine whether to perform proxy transmission, the HSS/IWF 430 may refer to the information on the RAT to which the UE 410 is attached. In particular, the HSS/IWF 430 may request to perform proxy transmission only when the UE 410 is using a specific RAT (e.g. GERAN with a low transfer rate). The HSS/IWF 430 may determine whether to request application of protocol translation on the basis of the type of the RAT to which the UE 410 is connected (e.g. convert a CoAP message sent by the UE 410 to a HTTP message, or convert a HTTP message to be sent to the UE 410 to a CoAP message).

The SCS 450 may be aware that it has to perform message transmission on behalf of the UE 410 according to the previously received message. In one embodiment, to distinguish the UE 410 from an actual server, the SCS 450 may extract not only the source IP address and port but also the destination IP address and port from the message sent by the UE 410 and store the extracted address information. When the UE 410 notifies the SCS 450 of its external ID, the SCS 450 may store the external ID. Meanwhile, to determine whether to perform the above operation, the SCS 450 may refer to the information on the RAT to which the UE 410 is connected. In particular, the SCS 450 may perform the above operation only when the UE 410 is using a specific RAT (e.g. GERAN with a low transfer rate). The SCS 450 may determine whether to apply protocol translation on the basis of the type of the RAT to which the UE 410 is connected (e.g. convert a CoAP message sent by the UE 410 to a HTTP message, or convert a HTTP message to be sent to the UE 410 to a CoAP message).

Thereafter, at step 493, the SCS 450 sends a message indicating message reception to the UE 410. The message may use the same protocol as used for the corresponding message received from the UE 410 and may have, for example, "200 OK" as transmission code or cause. In one embodiment, the message may be forwarded through the PGW 440 to the UE 410 (step 494).

At step 497, the SCS 450 determines whether to perform proxy transmission for the UE 410 on the basis of the status information of the UE 410 received from the HSS/IWF 430 at step 491. When the message received from the HSS/IWF 430 contains information on the time duration for power saving mode of the UE 410, the SCS 450 may start a timer set to a value corresponding to the time duration and perform proxy transmission for the UE 410 until expiration of the timer.

Meanwhile, when the active timer expires, at step 495, the UE 410 enters power saving mode.

Thereafter, at step 498, the SCS 450 receives a message requesting the UE 410 to send data from a server. The message may be an IP based message. More specifically, the message may be a message using the CoAP, MQTT, XMPP, or HTTP protocol. The message may have, for example, "GET" as transmission code or cause. The SCS 450 may compare the destination address (IP address and port) or external ID of the received message with the stored information to find a matching UE (e.g. UE 410). When a matching UE (UE 410) is found, the SCS 450 may be aware that it has to respond to the received message on behalf of the UE 410 remaining in power saving mode.

At step 499, the SCS 450 sends a response message on behalf of the UE 410. The response message may be an IP based message. More specifically, the response message may be a message using the CoAP, MQTT, XMPP, or HTTP protocol. The response message may have, for example, "200 OK" as transmission code or cause. The response message may contain the data or message having been received from the UE 410 for proxy transmission. In one embodiment, the source address or external ID of the message may be set to the address or external ID of the UE 410 (not the SCS 450). If the protocol used for the message having been sent by the UE 410 (e.g. CoAP protocol) is different from that used by the server (e.g. HTTP protocol), the SCS 450 may perform protocol translation.

In the above embodiment, the UE 410 is described as entering power saving mode after being attached to the network (i.e. TA update). However, the above operations may be applied when the UE 410 performs the attach procedure. When the above embodiment is applied while the attach procedure is in progress, the TA update request message and the TAU accept message may be replaced with the attach request message and the attach accept message, respectively.

Figure 5:
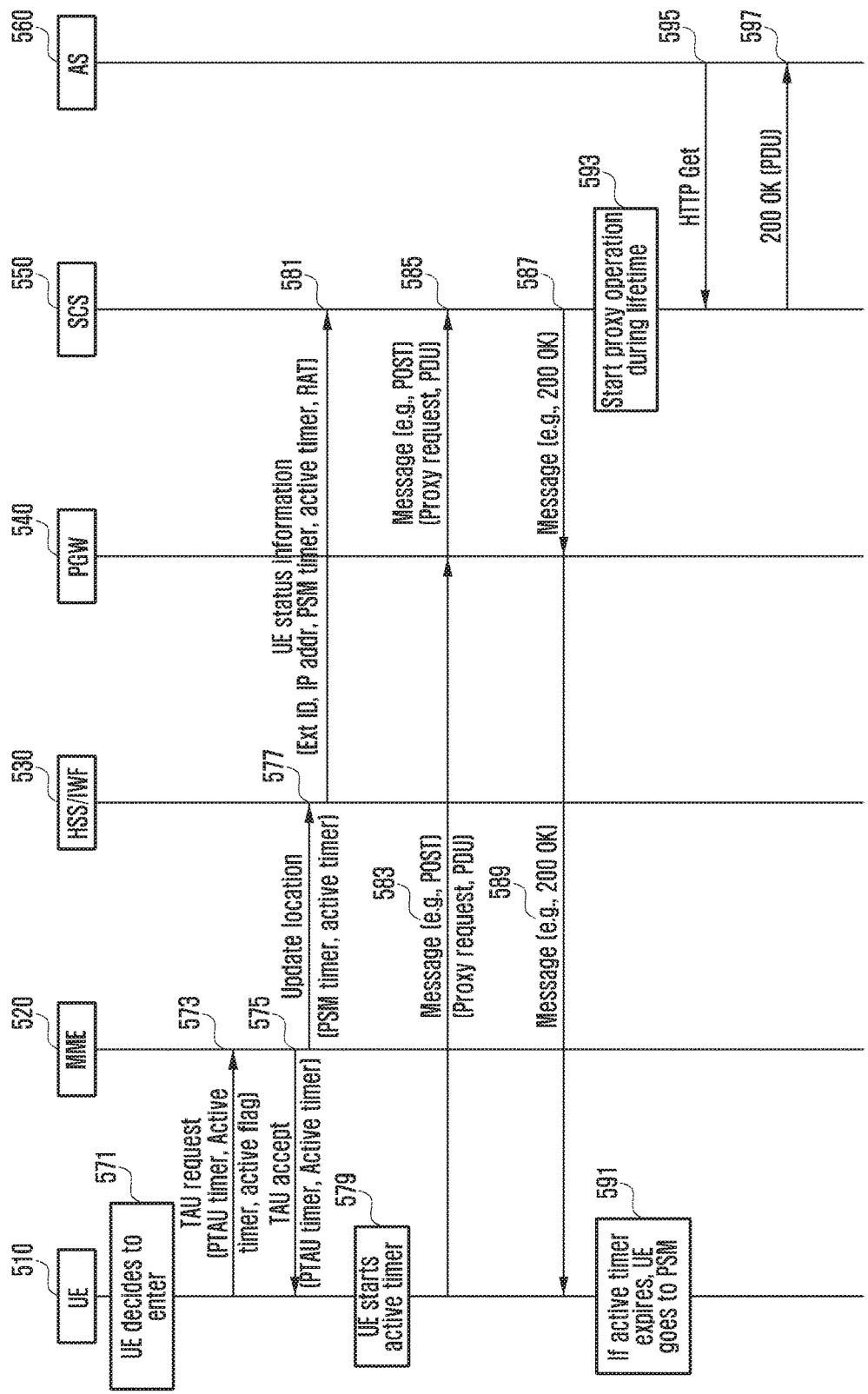
FIG. 5 is a sequence diagram depicting a procedure of the communication system to send a message for a user equipment operating in power saving mode according to another embodiment of the present invention.

FIG. 5 is a sequence diagram depicting a procedure of the communication system to send a message for a user equipment operating in power saving mode according to another embodiment of the present invention.

Referring to FIG. 5, at step 571, the UE 510 determines to enter power saving mode in consideration of terminal states, service application requests, and configuration information.

To enter power saving mode, at step 573, the UE 510 sends a TA update request message to the MME 520. The TA update request message may contain at least one of periodic TAU timer value, active timer value, and active flag, if necessary. When the UE 510 has a message to be sent before entering power saving mode, the TA update request message may be sent with the active flag set. In one embodiment, the UE 510 may insert information that explicitly requests the network to perform message transmission on behalf of the UE 510 (proxy transmission request) in the TA update request message. In one embodiment, the UE 510 may insert an indicator for low priority or low sensitivity to transmission delay in the TA update request message.

Upon reception of the TA update request from the UE 510, the MME 520 may determine whether to allow power saving mode and corresponding parameters (e.g. periodic TAU timer value and active timer value). At step 575, the MME 520 sends a TA update accept message containing the determination result to the UE 510. The MME 520 may determine whether to enable the network to perform proxy transmission for the UE 510 on the basis of requests from the UE 510 (e.g. indicator for low priority or low sensitivity to transmission delay), characteristics of the PDN connection associated with the UE 510 (e.g. APN and ARP), internal settings of the UE 510, and subscription information of the UE 510. In one embodiment, the MME 520 may explicitly insert the determination result in the TA update accept message.

Thereafter, at step 579, the UE 510 extracts necessary parameters from the TA update accept message and prepares for entering power saving mode according to the parameters. In particular, the UE 510 may start the active timer and wait for expiration of the active timer without entering power saving mode.

Meanwhile, at step 577, the MME 520 notifies the HSS or IWF 530 that the UE 510 has transitioned to power saving mode. In one embodiment, the MME 520 may also send the HSS/IWF 530 information regarding at least one of the identifier of the UE 510, the IP address thereof, the duration in which the UE 510 remains in power saving mode, and the active timer value. The HSS/IWF 530 stores the information received from the MME 520. Later, when information on the UE 510 is requested by the SCS 550 or when the state of the UE 510 changes, the HSS/IWF 530 may send at least a portion of the stored information to the SCS 550.

At step 581, the HSS/IWF 530 sends a message containing status information of the UE 510 to the SCS 550. In one embodiment, the status information of the UE 510 may be sent to the SCS 550 when the UE 510 enters power saving mode or when the UE 510 transitions from power saving mode to another mode. The message may include information regarding at least one of the external ID of the UE 510, the IP address of the UE 510, the current state of the UE 510 (power saving mode or not), the RAT to which the UE 510 is attached, and the timer indicating the duration of power saving mode (e.g. periodic TAU timer). The message may include information indicating proxy transmission for the UE 510 during power saving mode. The message may include an active timer value. When an active timer value is contained in the message, the SCS 550 may start the active timer and initiate proxy transmission for the UE 510 upon expiration of the active timer. The SCS 550 stores these information items contained in the message and may be aware of the current state of the UE 510 and the duration of power saving mode on the basis of the information items.

Meanwhile, to determine whether to perform proxy transmission, the HSS/IWF 530 may refer to the information on the RAT to which the UE 510 is attached. In particular, the HSS/IWF 530 may request to perform proxy transmission only when the UE 510 is using a specific RAT (e.g. GERAN with a low transfer rate). The HSS/IWF 530 may determine whether to request application of protocol translation on the basis of the type of the RAT to which the UE 510 is attached (e.g. convert a CoAP message sent by the UE 510 to a HTTP message, or convert a HTTP message to be sent to the UE 510 to a CoAP message).

Meanwhile, at step 579, the UE 510 may determine whether to request the network to perform message transmission on behalf of the UE 510 (i.e. whether to make a proxy transmission request) in response to a data transmission request from a server (or external network) during power saving mode. The UE 510 may perform this determination on the basis of internal configuration information, or information contained in the TA update accept message or attach accept message received earlier (e.g. information on whether the network supports proxy transmission for a specific UE).

Upon determining to make a proxy transmission request, when there is a message to be sent, at step 583, the UE 510 sends the message to the SCS 550 before expiration of the active timer. The message may be an IP based message. More specifically, the message may be a message using the CoAP, MQTT, XMPP, or HTTP protocol. The message may have, for example, "POST" as transmission code or cause. The message may include at least one of information indicating proxy transmission, message payload (PDU), and external ID of the UE 510. In one embodiment, at step 585, the message may be forwarded through the PGW 540 to the SCS 550. The destination address of the message may be set to the previously received address of the SCS 550.

As described above, the SCS 550 may receive a message from the UE 510 at step 583 (and at step 585).

The SCS 550 may be aware that it has to perform message transmission on behalf of the UE 510 according to the previously received message. In one embodiment, to distinguish the UE 510 from an actual server, the SCS 550 may extract not only the source IP address and port but also the destination IP address and port from the message sent by the UE 510 and store the extracted address information. When the UE 510 notifies the SCS 550 of its external ID, the SCS 550 may store the external ID. Meanwhile, to determine whether to perform the above operation, the SCS 550 may refer to the information on the RAT to which the UE 510 is connected. In particular, the SCS 550 may perform the above operation only when the UE 510 is using a specific RAT (e.g. GERAN with a low transfer rate). The SCS 550 may determine whether to apply protocol translation on the basis of the type of the RAT to which the UE 510 is connected (e.g. convert a CoAP message sent by the UE 510 to a HTTP message, or convert a HTTP message to be sent to the UE 510 to a CoAP message).

Thereafter, at step 587, the SCS 550 sends a message indicating message reception to the UE 510. The message may use the same protocol as used for the corresponding message received from the UE 510 and may have, for example, "200 OK" as transmission code or cause. In one embodiment, the message may be forwarded through the PGW 540 to the UE 510 (step 589).

At step 593, the SCS 550 determines whether to perform proxy transmission for the UE 510 on the basis of the status information of the UE 510 received from the HSS/IWF 530 at step 581. When the message received from the HSS/IWF 530 contains information on the time duration for power saving mode of the UE 510, the SCS 550 may start a timer set to a value corresponding to the time duration and perform proxy transmission for the UE 510 until expiration of the timer.

Meanwhile, when the active timer expires, at step 591, the UE 510 enters power saving mode.

Thereafter, at step 595, the SCS 550 receives a message requesting the UE 510 to send data from a server. The message may be an IP based message. More specifically, the message may be a message using the CoAP, MQTT, XMPP, or HTTP protocol. The message may have, for example, "GET" as transmission code or cause. The SCS 550 may compare the destination address (IP address and port) or external ID of the received message with the stored information to find a matching UE (e.g. UE 510). When a matching UE (UE 510) is found, the SCS 550 may be aware that it has to respond to the received message on behalf of the UE 510 remaining in power saving mode.

At step 597, the SCS 550 sends a response message on behalf of the UE 510. The response message may be an IP based message. More specifically, the response message may be a message using the CoAP, MQTT, XMPP, or HTTP protocol. The response message may have, for example, "200 OK" as transmission code or cause. The response message may contain the data or message having been received from the UE 510 for proxy transmission. In one embodiment, the source address or external ID of the message may be set to the address or external ID of the UE 510 (not the SCS 550). If the protocol used for the message having been sent by the UE 510 (e.g. CoAP protocol) is different from that used by the server (e.g. HTTP protocol), the SCS 550 may perform protocol translation.

In the above embodiment, the UE 510 is described as entering power saving mode after being attached to the network (i.e. TA update). However, the above operations may be applied when the UE 510 performs the attach procedure. When the above embodiment is applied while the attach procedure is in progress, the TA update request message and the TAU accept message may be replaced with the attach request message and the attach accept message, respectively.

Hereinabove, a description is given of a scheme that enables the UE to remain in power saving mode by causing, when a server issues an information (or message) request to the UE remaining in power saving mode, a network entity to provide the requested information to the server on behalf of the UE.

On the other hand, while a UE remains in power saving mode and is unable to perform data transmission and reception, when downlink data is generated for the UE and the network attempts to send the downlink data, unnecessary transmission signaling may be caused. This may also cause the network to discard the data owing to transmission failure.

Next, a description is given of a scheme that, when a downlink message is generated for a UE remaining in power saving mode, can prevent unnecessary transmission attempts or message loss for the UE.

Figure 6:
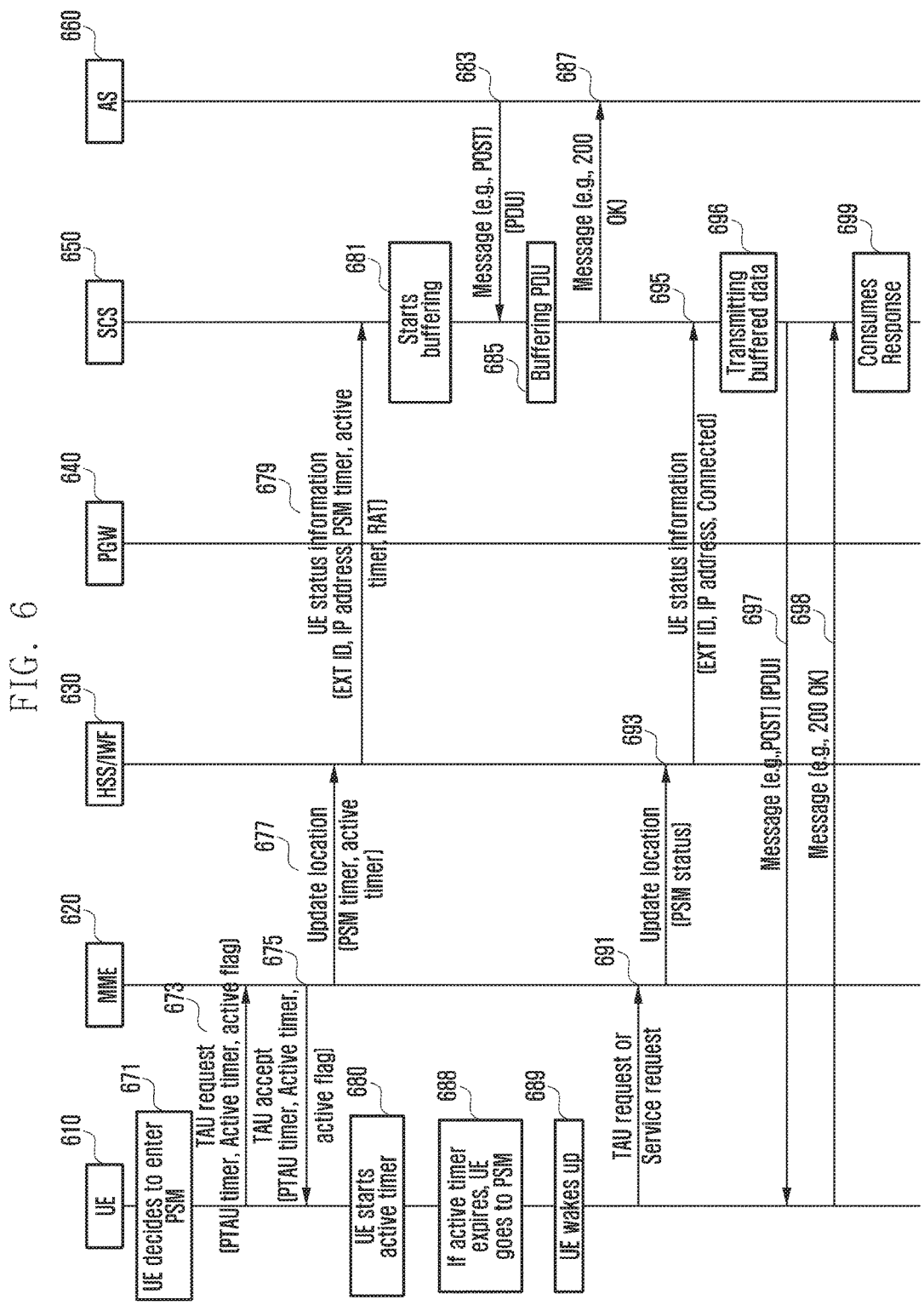
FIG. 6 is a sequence diagram depicting operations of the user equipment and the network according to an embodiment of the present invention.

FIG. 6 is a sequence diagram depicting operations of the user equipment and the network according to an embodiment of the present invention.

Referring to FIG. 6, at step 671, the UE 610 determines to enter power saving mode in consideration of terminal states, service application requests, and configuration information.

To enter power saving mode, at step 673, the UE 610 sends a TA update request message to the MME 620. The TA update request message may contain at least one of periodic TAU timer value, active timer value, and active flag, if necessary. When the UE 610 has a message to be sent before entering power saving mode, the TA update request message may be sent with the active flag set. In one embodiment, the UE 610 may insert information that explicitly requests the network to receive and buffer a message on behalf of the UE 610 in the TA update request message. In one embodiment, the UE 610 may insert an indicator for low priority or low sensitivity to transmission delay in the TA update request message.

Upon reception of the TA update request from the UE 610, the MME 620 may determine whether to allow power saving mode and corresponding parameters (e.g. periodic TAU timer value and active timer value). At step 675, the MME 620 sends a TA update accept message containing the determination result to the UE 610. The MME 620 may determine whether to enable the network to perform proxy reception and buffering for the UE 610 remaining in power saving mode on the basis of requests from the UE 610 (e.g. indicator for low priority or low sensitivity to transmission delay), characteristics of the PDN connection associated with the UE 610 (e.g. APN and ARP), internal settings of the UE 610, and subscription information of the UE 610. In one embodiment, the MME 620 may explicitly insert the determination result in the TA update accept message.

Thereafter, at step 680, the UE 610 extracts necessary parameters from the TA update accept message and prepares for entering power saving mode according to the parameters. In particular, the UE 610 may start the active timer and wait for expiration of the active timer without entering power saving mode.

Meanwhile, at step 677, the MME 620 notifies the HSS or IWF 630 that the UE 610 has transitioned to power saving mode. In one embodiment, the MME 620 may also send the HSS/IWF 630 information regarding at least one of the identifier of the UE 610, the IP address thereof, and the duration in which the UE 610 remains in power saving mode. The notification message may contain an active timer value. The notification message may contain information indicating application of proxy reception and buffering for the UE 610. The HSS/IWF 630 stores the information received from the MME 620. Later, when information on the UE 610 is requested by the SCS 650 or when the state of the UE 610 changes, the HSS/IWF 630 may send at least a portion of the stored information to the SCS 650.

Thereafter, at step 679, the HSS/IWF 630 sends a message containing status information of the UE 610 to the SCS 650. In one embodiment, the status information of the UE 610 may be sent to the SCS 650 when the UE 610 enters power saving mode or when the UE 610 transitions from power saving mode to another mode. The message may include information regarding at least one of the external ID of the UE 610, the IP address of the UE 610, the current state of the UE 610 (power saving mode or not), the timer indicating the duration of power saving mode (e.g. periodic TAU timer), the RAT to which the UE 610 is attached, and the active timer. The message may include information indicating application of proxy reception and buffering for the UE 610. Upon reception of the message, the SCS 650 may store information items contained in the message and may be aware of the current state of the UE 610 and the duration of power saving mode on the basis of the information items.

Meanwhile, to determine whether to perform proxy reception and buffering, the HSS/IWF 630 may refer to the information on the RAT to which the UE 610 is attached. In particular, the HSS/IWF 630 may request to perform proxy reception and buffering only when the UE 610 is using a specific RAT (e.g. GERAN with a low transfer rate). The HSS/IWF 630 may determine whether to request application of protocol translation on the basis of the type of the RAT to which the UE 610 is attached (e.g. convert a CoAP message sent by the UE 610 to a HTTP message, or convert a HTTP message to be sent to the UE 610 to a CoAP message).

At step 681, the SCS 650 starts proxy reception for the UE 610. When an active timer value is contained in a received status information message of the UE 610, the SCS 650 may start the active timer upon message reception and initiate message reception on behalf of the UE 610 upon expiration of the active timer. Meanwhile, to determine whether to perform the above operation, the SCS 650 may refer to the information on the RAT to which the UE 610 is connected. In particular, the SCS 650 may perform the above operation only when the UE 610 is using a specific RAT (e.g. GERAN with a low transfer rate). The SCS 650 may determine whether to apply protocol translation on the basis of the type of the RAT to which the UE 610 is connected (e.g. convert a CoAP message sent by the UE 610 to a HTTP message, or convert a HTTP message to be sent to the UE 610 to a CoAP message).

Later, at step 683, the SCS 650 receives a message destined for the UE 610 from the server 660. The message may be an IP based message. More specifically, the message may be a message using the CoAP, MQTT, XMPP, or HTTP protocol. The message may have, for example, "POST" or "PUT" as transmission code or cause. The destination address of the message may be the address (or external ID) of the UE 610.

The SCS 650 may be aware that it has to perform message reception on behalf of the UE 610 according to the previously received and stored information. That is, the SCS 650 may determine whether to perform proxy reception for the UE 610 by examining the destination address or external ID of the received message. Upon determining to perform proxy reception for the UE 610, at step 685, the SCS 650 buffers the received message. In one embodiment, if the protocol used by the UE 610 for message transmission and reception (e.g. CoAP protocol) is different from that used by the server (e.g. HTTP protocol), the SCS 650 may perform protocol translation.

At step 687, the SCS 650 sends a response message indicating message reception to the server 660. The response message may use the same protocol as that used by the corresponding message sent by the server 660. The response message may have, for example, "200 OK" as transmission code or cause. The source address (or external ID) of the response message may be set to the IP address (or external ID) of the UE 610 (not the SCS 650).

Meanwhile, when the active timer expires, at step 688, the UE 610 enters power saving mode.

Later, at step 689, the UE 610 transitions from power saving mode to data transceive mode. This transition may be caused by, for example, expiration of the periodic TAU timer for TA update.

At step 691, the UE 610 sends a TA update request message or service request message to the MME 620.

At step 693, the MME 620 notifies the HSS or IWF 630 that the UE 610 has transitioned from power saving mode to data transceive mode.

At step 695, the HSS/IWF 630 sends a message containing status information of the UE 610 to the SCS 650. The status information of the UE 610 may be sent to the SCS 650 when the UE 610 enters power saving mode or when the UE 610 transitions from power saving mode to another mode. The message may include information regarding at least one of the external ID of the UE 610, the IP address of the UE 610, and the current state of the UE 610 (power saving mode or not). The message may include information indicating delivery of messages received on behalf of the UE 610 to the UE 610.

Upon reception of the message, at step 697, the SCS 650 is aware of a change in the state of the UE 610 and starts to send a buffered message to the UE 610. If the protocol used by the UE 610 for message transmission and reception (e.g. CoAP protocol) is different from that used by the server (e.g. HTTP protocol), the SCS 650 may perform protocol translation.

The message sent by the SCS 650 to the UE 610 may be an IP based message. More specifically, the message may be a message using the CoAP, MQTT, XMPP, or HTTP protocol. The message may have, for example, "POST" or "PUT" as transmission code or cause. The destination address (IP address or external ID) of the message may be set to that of the UE 610 and the source address thereof may be set to that of the SCS 650.

At step 698, the UE 610 sends a response message to the SCS 650. The response message may be an IP based message. More specifically, the response message may be a message using the CoAP, MQTT, XMPP, or HTTP protocol. The response message may have, for example, "200 OK" as transmission code or cause.

Upon reception of the response message, at step 699, the SCS 650 may autonomously handle the response message without forwarding thereof to the server 660 having sent the corresponding message.

In the above embodiment, the UE 610 is described as entering power saving mode after being attached to the network (i.e. TA update). However, the above operations may be applied when the UE 610 performs the attach procedure. When the above embodiment is applied while the attach procedure is in progress, the TA update request message and the TAU accept message may be replaced with the attach request message and the attach accept message, respectively.

Figure 7:
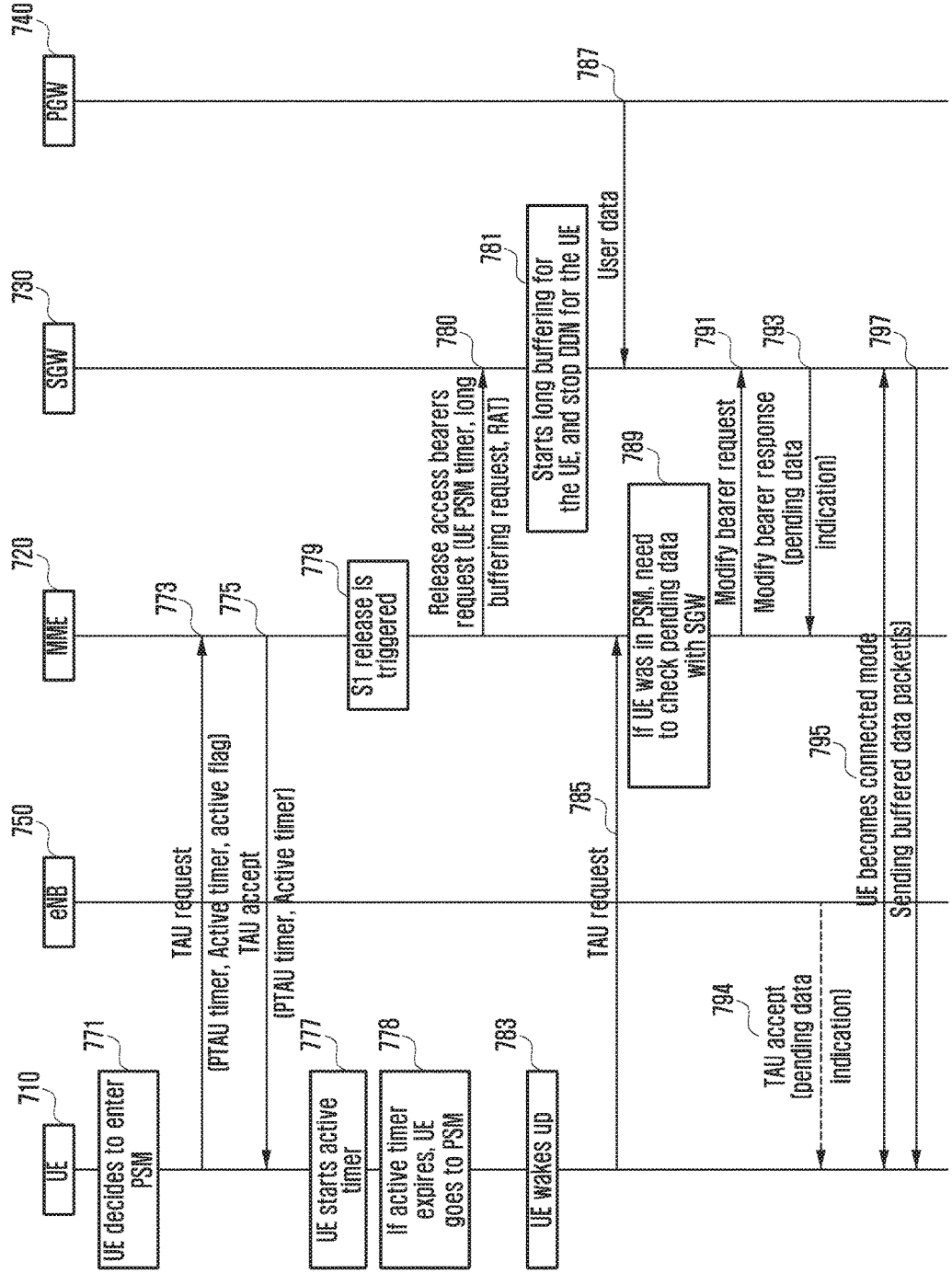
FIG. 7 is a sequence diagram depicting a procedure for receiving and processing a message on behalf of the user equipment according to an embodiment of the present invention.

FIG. 7 is a sequence diagram depicting a procedure for receiving and processing a message on behalf of the user equipment according to another embodiment of the present invention.

Referring to FIG. 7, at step 771, the UE 710 determines to enter power saving mode in consideration of terminal states, service application requests, and configuration information.

To enter power saving mode, at step 773, the UE 710 sends a TA update request message to the MME 720. The TA update request message may contain at least one of periodic TAU timer value, active timer value, and active flag, if necessary. When the UE 710 has a message to be sent before entering power saving mode, the TA update request message may be sent with the active flag set. In one embodiment, the UE 710 may insert information that explicitly requests the network to receive and buffer a message on behalf of the UE 710 in the TA update request message. In one embodiment, the UE 710 may insert an indicator for low priority or low sensitivity to transmission delay in the TA update request message.

Upon reception of the TA update request from the UE 710, the MME 720 may determine whether to allow power saving mode and corresponding parameters (e.g. periodic TAU timer value and active timer value). At step 775, the MME 720 sends a TA update accept message containing the determination result to the UE 710. The MME 720 may determine whether to enable the network to perform proxy reception and buffering for the UE 710 remaining in power saving mode on the basis of requests from the UE 710 (e.g. indicator for low priority or low sensitivity to transmission delay), characteristics of the PDN connection associated with the UE 710 (e.g. APN and ARP), internal settings of the UE 710, and subscription information of the UE 710. In one embodiment, the MME 720 may explicitly insert the determination result in the TA update accept message.

Thereafter, at step 777, the UE 710 extracts necessary parameters from the TA update accept message and prepares for entering power saving mode according to the parameters. In particular, the UE 710 may start the active timer and wait for expiration of the active timer without entering power saving mode.

Meanwhile, for the UE 710 in power saving mode, an S1 UE context release procedure may be performed between the ENB 750 and the MME 720. At step 780, the MME 720 sends the SGW 730 a message (e.g. Release Access Bearers Request) to notify a state change of the UE 710 and radio bearer release. The message may contain information indicating power saving mode of the UE 710, information on the time duration of power saving mode, information on the RAT to which the UE 710 is attached, and information indicating proxy reception and buffering for the UE 710 for an extended period of time. To determine whether to perform proxy reception and buffering, the MME 720 may refer to the information on the RAT to which the UE 710 is attached. In particular, the MME 720 may request to perform proxy reception and buffering only when the UE 710 is using a specific RAT (e.g. GERAN with a low transfer rate).

At step 781, the SGW 730 initiates proxy reception and buffering lasting for an extended period of time for the UE 710. If information on the time duration of power saving mode of the UE 710 is contained in the message received at step 780, the SGW 730 may start a timer set to a value corresponding to the time duration and perform proxy reception and buffering for the UE 710 until expiration of the timer. To determine whether to perform proxy reception and buffering, the SGW 730 may refer to the information on the RAT to which the UE 710 is attached. In particular, the SGW 730 may perform proxy reception and buffering only when the UE 710 is using a specific RAT (e.g. GERAN with a low transfer rate). The SGW 730 may determine whether to apply protocol translation on the basis of the type of the RAT to which the UE 710 is attached (e.g. convert a CoAP message sent by the UE 710 to a HTTP message, or convert a HTTP message to be sent to the UE 710 to a CoAP message).

Later, at step 787, the SGW 730 receives a message destined for the UE 710 from the server. The message may be contained in a packet received through a GTP-U or GRE tunnel from the PGW 740. The message may be an IP based message. More specifically, the message may be a message using the CoAP, MQTT, XMPP, or HTTP protocol. The message may have, for example, "POST" or "PUT" as transmission code or cause. The destination address of the message may be the address (or external ID) of the UE 710.

Meanwhile, when the active timer expires, at step 778, the UE 710 enters power saving mode.

Later, at step 783, the UE 710 transitions from power saving mode to data transceive mode. This transition may be caused by, for example, expiration of the periodic TAU timer for TA update.

At step 785, the UE 710 sends a TA update request message or service request message to the MME 720. When a message is to be sent or received, the UE 710 may insert the active flag in the TA update request message.

At step 789, after the UE 710 transitions from power saving mode to data transceive mode, the MME 720 checks whether a pending message for the UE 710 is present in the SGW 730. In one embodiment, checking presence of a pending message may be performed only when the active flag is not set in the TA update request message sent by the UE 710 or be performed according to reception of a message indicating presence of pending data destined for the UE 710 (i.e. downlink data notification message) from the SGW 730.

At step 791, the MME 720 sends a modify bearer request message to the SGW 730. This message may contain information enquiring about presence of pending data destined for the UE 710.

Upon reception of the modify bearer request message, at step 793, the SGW 730 sends a response message (e.g. modify bearer response message) to the MME 720. This message may contain information indicating presence of pending data destined for the UE 710.

During the TA update procedure or service request procedure, at step 794, the MME 720 or ENB 750 sends the UE 710 a TA update accept message containing information indicating presence of pending data for the UE 710. At this time, although the active flag is not set in the TA update request message sent by the UE 710, the MME 720 may perform the UE context and radio bearer setup procedure in the same manner as when the active flag is set by the UE 710. Alternatively, if information indicating presence of pending data is received when the UE 710 does not set the active flag in the TA update request message, the UE 710 may additionally perform the service request procedure.

Thereafter, at step 795, the UE 710 enters connected mode. At step 797, the SGW 730 sends the buffered message to the UE 710.

In the above embodiment, the UE 710 is described as entering power saving mode after being attached to the network (i.e. TA update). However, the above operations may be applied when the UE 710 performs the attach procedure. When the above embodiment is applied while the attach procedure is in progress, the TA update request message and the TAU accept message may be replaced with the attach request message and the attach accept message, respectively.

Figure 8:
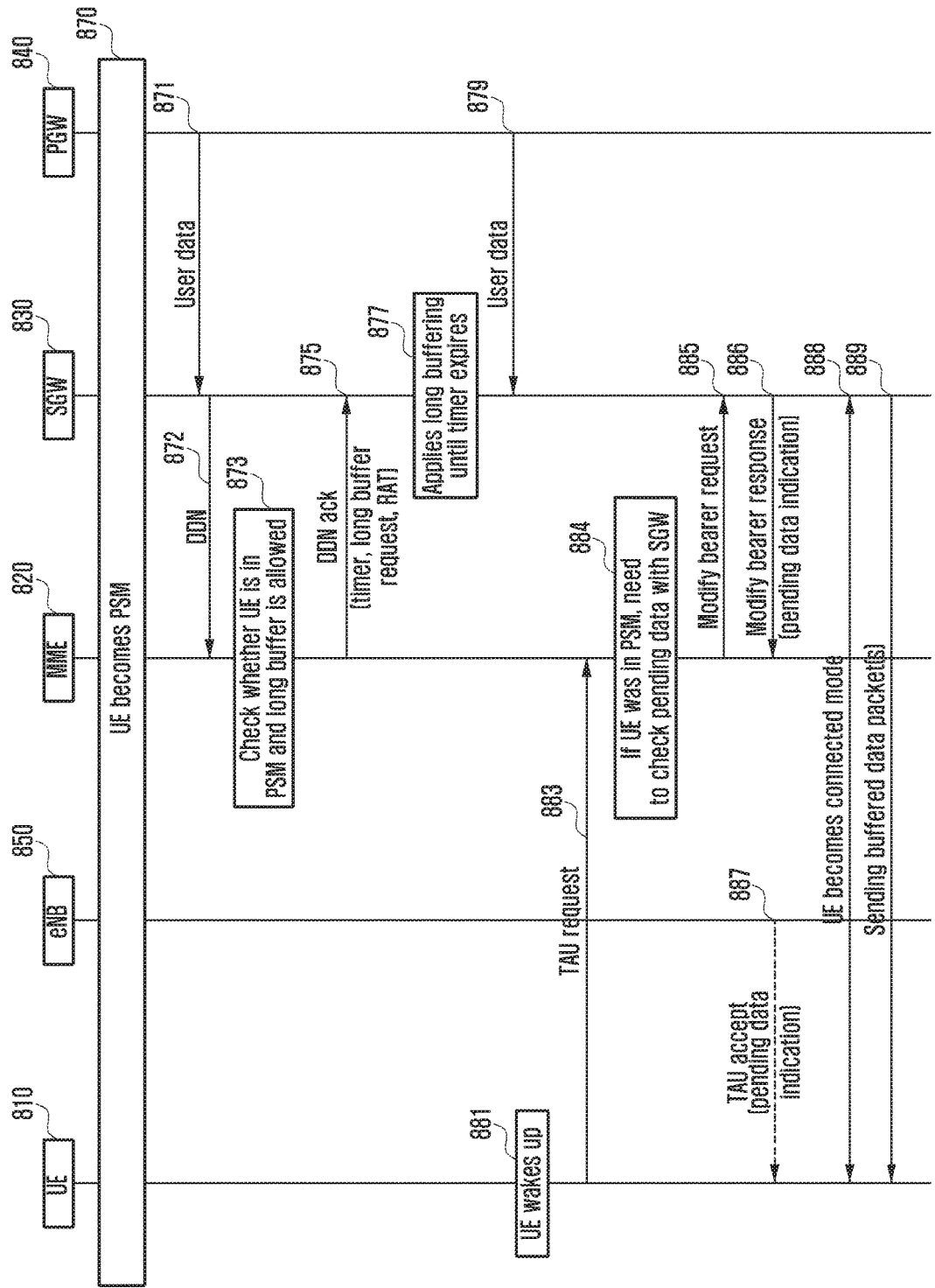
FIG. 8 is a sequence diagram depicting a procedure for receiving a message when the user equipment operates in power saving mode according to an embodiment of the present invention.

FIG. 8 is a sequence diagram depicting a procedure for receiving a message when the user equipment operates in power saving mode according to another embodiment of the present invention.

Referring to FIG. 8, at step 870, the UE 810 enters power saving mode. Entering power saving mode may be achieved using corresponding steps described in FIGS. 3 to 7. At this time, the SGW 830 become aware that the UE 810 is in idle mode.

When a packet destined for the UE 810 arrives at the PGW 840, at step 871, the PGW 840 sends the packet to the SGW 830.

Upon reception of the packet destined for the UE 810, at step 872, the SGW 830 sends a downlink data notification message to the MME 820.

Upon reception of the downlink data notification message from the SGW 830, at step 873, the MME 820 checks whether the UE 810 remains in power saving mode. The MME 820 may also determine whether to perform proxy reception and buffering lasting for an extended period of time for the UE 810 remaining in power saving mode.

At step 875, the MME 820 sends a response message (e.g. downlink data notification acknowledgement) to the SGW 830. The response message may contain at least one of information indicating power saving mode of the UE 810, information on the time duration of power saving mode, information on the RAT to which the UE 810 is attached, and information indicating proxy reception and buffering for the UE 810 for an extended period of time. To determine whether to perform proxy reception and buffering, the MME 820 may refer to the information on the RAT to which the UE 810 is attached. In particular, the MME 820 may request to perform proxy reception and buffering only when the UE 810 is using a specific RAT (e.g. GERAN with a low transfer rate).

At step 877, the SGW 830 initiates proxy reception and buffering lasting for an extended period of time for the UE 810. If information on the time duration of power saving mode of the UE 810 is contained in the message received at step 875, the SGW 830 may start a timer set to a value corresponding to the time duration and perform proxy reception and buffering for the UE 810 until expiration of the timer. To determine whether to perform proxy reception and buffering, the SGW 830 may refer to the information on the RAT to which the UE 810 is attached. In particular, the SGW 830 may perform proxy reception and buffering only when the UE 810 is using a specific RAT (e.g. GERAN with a low transfer rate). The SGW 830 may determine whether to apply protocol translation on the basis of the type of the RAT to which the UE 810 is attached (e.g. convert a CoAP message sent by the UE 810 to a HTTP message, or convert a HTTP message to be sent to the UE 810 to a CoAP message).

Later, at step 879, the SGW 830 receives a message destined for the UE 810 from the server. The message may be contained in a packet received through a GTP-U or GRE tunnel from the PGW 840. The message may be an IP based message. More specifically, the message may be a message using the CoAP, MQTT, XMPP, or HTTP protocol. The message may have, for example, "POST" or "PUT" as transmission code or cause. The destination address of the message may be the address (or external ID) of the UE 810.

Meanwhile, when the active timer expires, the UE 810 enters power saving mode.

Later, at step 881, the UE 810 transitions from power saving mode to data transceive mode. This transition may be caused by, for example, expiration of the periodic TAU timer for TA update.

At step 883, the UE 810 sends a TA update request message or service request message to the MME 820. When a message is to be sent or received, the UE 810 may insert the active flag in the TA update request message.

At step 884, after the UE 810 transitions from power saving mode to data transceive mode, the MME 820 checks whether a pending message for the UE 810 is present in the SGW 830. In one embodiment, checking presence of a pending message may be performed only when the active flag is not set in the TA update request message sent by the UE 810 or be performed according to reception of a message indicating presence of pending data destined for the UE 810 (i.e. downlink data notification message) from the SGW 830.

At step 885, the MME 820 sends a modify bearer request message to the SGW 830. This message may contain information enquiring about presence of pending data destined for the UE 810.

Upon reception of the modify bearer request message, at step 886, the SGW 830 sends a response message (e.g. modify bearer response message) to the MME 820. This message may contain information indicating presence of pending data destined for the UE 810.

During the TA update procedure or service request procedure, at step 887, the MME 820 or ENB 850 sends the UE 810 a TA update accept message containing information indicating presence of pending data for the UE 810. At this time, although the active flag is not set in the TA update request message sent by the UE 810, the MME 820 may perform the UE context and radio bearer setup procedure in the same manner as when the active flag is set by the UE 810. Alternatively, if information indicating presence of pending data is received when the UE 810 does not set the active flag in the TA update request message, the UE 810 may additionally perform the service request procedure.

Thereafter, at step 888, the UE 810 enters connected mode. At step 889, the SGW 830 sends the buffered message to the UE 810.

In the above embodiment, the UE 810 is described as entering power saving mode after being attached to the network (i.e. TA update). However, the above operations may be applied when the UE 810 performs the attach procedure. When the above embodiment is applied while the attach procedure is in progress, the TA update request message and the TAU accept message may be replaced with the attach request message and the attach accept message, respectively.

Hereinabove, a description is given of a scheme that, when a downlink message is generated for a UE remaining in power saving mode, can prevent unnecessary transmission attempts or message loss for the UE.

Meanwhile, when a user equipment remaining in power saving mode does not perform data transmission or reception for a relatively long time, the network (NAT) may deallocate or reclaim the IP address allocated to the user equipment. In this case, as the address permitting an external network to access the user equipment is removed, the external network cannot send a message to the user equipment remaining in power saving mode. Upon transitioning from power saving mode to another mode, the user equipment may have to re-register the IP address.

Next, to solve the above problem, a description is given of a scheme that enables a user equipment remaining in power saving mode to maintain its IP address by causing a network node (e.g. SCS) to periodically transmit a message (e.g. keep-alive message) on behalf of the user equipment remaining in power saving mode.

Figure 9:
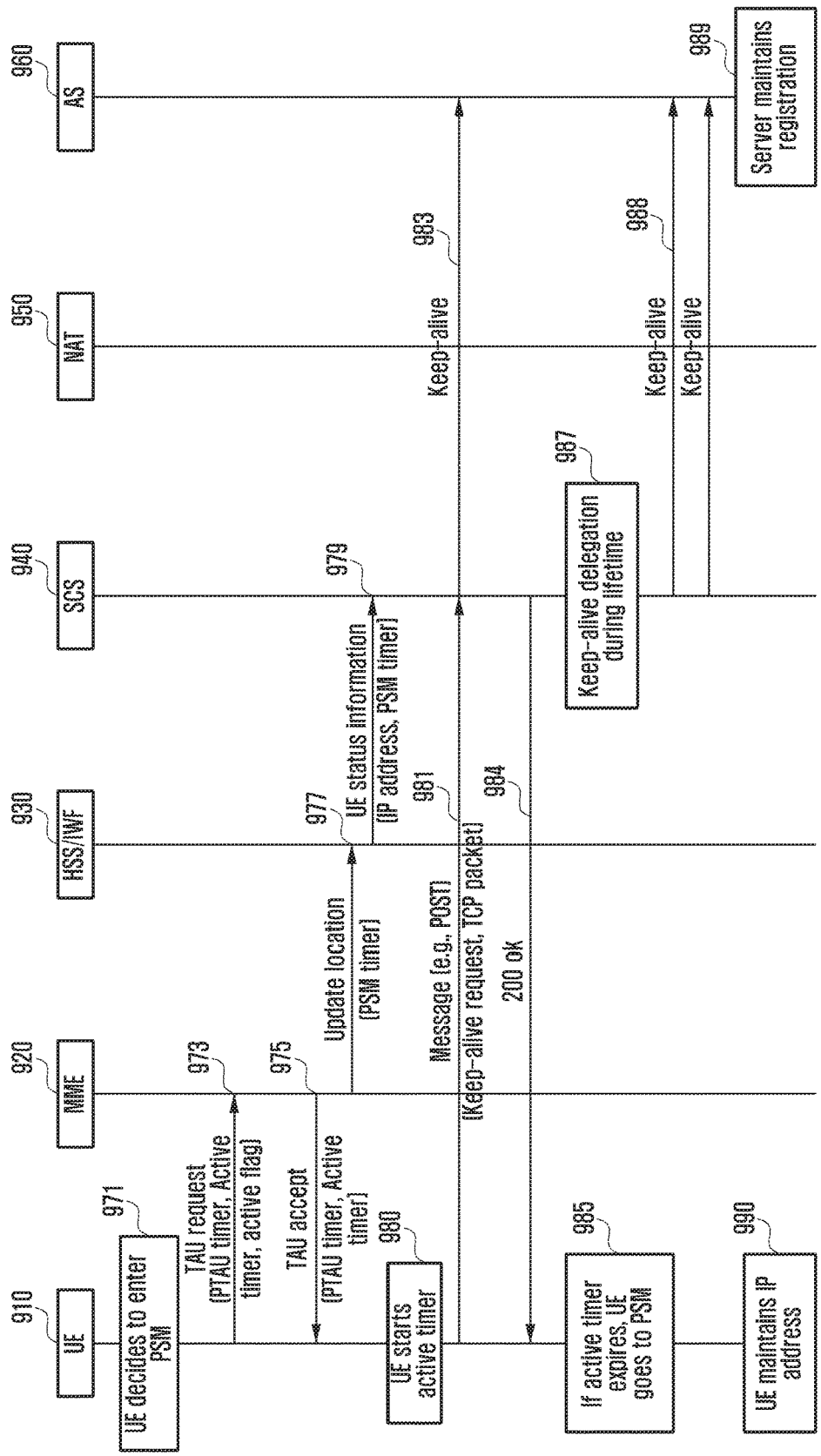
FIG. 9 is a sequence diagram depicting a procedure for maintaining connectivity to the user equipment according to an embodiment of the present invention.

FIG. 9 is a sequence diagram depicting a procedure for maintaining connectivity to the user equipment according to an embodiment of the present invention.

Referring to FIG. 9, at step 971, the UE 910 determines to enter power saving mode in consideration of terminal states, service application requests, and configuration information.

To enter power saving mode, at step 973, the UE 910 sends a TA update request message to the MME 920. The TA update request message may contain at least one of periodic TAU timer value, active timer value, and active flag, if necessary. When the UE 910 has a message to be sent before entering power saving mode, the TA update request message may be sent with the active flag set. In one embodiment, the UE 910 may insert information that explicitly requests the network to perform message transmission for IP address maintenance on behalf of the UE 910 in the TA update request message. In one embodiment, the UE 910 may insert an indicator for low priority or low sensitivity to transmission delay in the TA update request message.

Upon reception of the TA update request from the UE 910, the MME 920 may determine whether to allow power saving mode and corresponding parameters (e.g. periodic TAU timer value and active timer value). At step 975, the MME 920 sends a TA update accept message containing the determination result to the UE 910. The MME 920 may determine whether to enable the network to perform message transmission for IP address maintenance on behalf of the UE 910 on the basis of requests from the UE 910 (e.g. indicator for low priority or low sensitivity to transmission delay), characteristics of the PDN connection associated with the UE 910 (e.g. APN and ARP), internal settings of the UE 910, and subscription information of the UE 910. In one embodiment, the MME 920 may explicitly insert the determination result in the TA update accept message.

Thereafter, at step 980, the UE 910 extracts necessary parameters from the TA update accept message and prepares for entering power saving mode according to the parameters. In particular, the UE 910 may start the active timer and wait for expiration of the active timer without entering power saving mode.

Meanwhile, at step 977, the MME 920 notifies the HSS or IWF 930 that the UE 910 has transitioned to power saving mode. In one embodiment, the MME 920 may also send the HSS/IWF 930 information regarding at least one of the identifier of the UE 910, the IP address thereof, the duration in which the UE 910 remains in power saving mode, and the active timer value. The HSS/IWF 930 stores the information received from the MME 920. Later, when information on the UE 910 is requested by the SCS 940 or when the state of the UE 910 changes, the HSS/IWF 930 may send at least a portion of the stored information to the SCS 940.

At step 979, the HSS/IWF 930 sends a message containing status information of the UE 910 to the SCS 940. In one embodiment, the status information of the UE 910 may be sent to the SCS 940 when the UE 910 enters power saving mode or when the UE 910 transitions from power saving mode to another mode. The status information message may include information regarding at least one of the external ID of the UE 910, the IP address of the UE 910, the current state of the UE 910 (power saving mode or not), and the timer indicating the duration of power saving mode (e.g. periodic TAU timer). The message may include information indicating message transmission for IP address maintenance on behalf of the UE 910 during power saving mode. In one embodiment, the message may include an active timer value. When an active timer value is contained in the message, the SCS 940 may start the active timer and initiate proxy transmission for the UE 910 upon expiration of the active timer. The SCS 940 stores these information items contained in the message and may be aware of the current state of the UE 910 and the duration of power saving mode on the basis of the information items.

Meanwhile, at step 980, the UE 910 may determine whether to request the network to transmit a keep-alive message on behalf of the UE 910 during power saving mode. The UE 910 may perform this determination on the basis of internal configuration information, or information contained in the TA update accept message or attach accept message received earlier (e.g. information on whether the network supports transmission of a keep-alive message on behalf of a specific UE). Upon determining to make a proxy transmission request, at step 981, the UE 910 sends a message containing the determination result to the SCS 940 before expiration of the active timer. The message may be an IP based message. More specifically, the message may be a message using the TCP, CoAP, MQTT, XMPP, or HTTP protocol. The message may have, for example, "POST" as transmission code or cause. The message may contain a TCP keep-alive message. The message may include at least one of information indicating proxy transmission, message payload (PDU), and external ID of the UE 910. Although not shown, in one embodiment, the message may be forwarded through the PGW to the SCS 940. The destination address of the message may be set to the previously received address of the SCS 940.

As described above, the SCS 940 may receive a message from the UE 910.

The SCS 940 may be aware that it has to transmit a keep-alive message on behalf of the UE 910 according to the previously received message. In one embodiment, to distinguish the UE 910 from an actual server, the SCS 940 may extract not only the source IP address and port but also the destination IP address and port from the message sent by the UE 910 and store the extracted address information. When the UE 910 notifies the SCS 940 of its external ID, the SCS 940 may store the external ID.

Thereafter, at step 984, the SCS 940 sends a message indicating message reception to the UE 910. The message may use the same protocol as used for the corresponding message received from the UE 910 and may have, for example, "200 OK" as transmission code or cause. Although not shown, in one embodiment, the message may be forwarded through the PGW to the UE 910.

The SCS 940 determines whether to perform proxy transmission for the UE 910 on the basis of the status information of the UE 910 received from the HSS/IWF 930 at step 979. When the message received from the HSS/IWF 930 contains information on the time duration for power saving mode of the UE 910, the SCS 940 may start a timer set to a value corresponding to the time duration and perform proxy transmission for the UE 910 until expiration of the timer.

Meanwhile, when the active timer expires, at step 985, the UE 910 enters power saving mode.

The SCS 940 generates a keep-alive message at step 987 and sends the keep-alive message at step 988 on a periodic basis on behalf of the UE 910. The message may be an IP based message. More specifically, the message may be a message using the TCP, CoAP, MQTT, XMPP, or HTTP protocol. The message may be a message received from the UE 910 or a message generated directly by the SCS 940. The source address (IP address and port) or external ID of the message may be set to the address or external ID of the UE 910 (not the SCS 940).

In the above embodiment, the UE 910 is described as entering power saving mode after being attached to the network (i.e. TA update). However, the above operations may be applied when the UE 910 performs the attach procedure. When the above embodiment is applied while the attach procedure is in progress, the TA update request message and the TAU accept message may be replaced with the attach request message and the attach accept message, respectively.

Hereinabove, a description is given of a scheme that enables a user equipment remaining in power saving mode to maintain its IP address by causing a network node (e.g. SCS) to periodically transmit a message (e.g. keep-alive message) on behalf of the user equipment remaining in power saving mode.

Meanwhile, when a user equipment connects to a specific network and generates a PDN connection or updates contexts of an existing PDN connection, the operator network may determine whether the PDN connection can be offloaded to a wireless LAN (WLAN) and notify this offloadability information to the user equipment. Then, the user equipment may identify offloadability of a PDN connection to a WLAN (WLAN offloadability) on the basis of the information received from the operator network.

When the user equipment moves to a different network or area, WLAN offloadability for the user equipment is to be updated. This is because network structures or configurations for WLAN offloading may differ by operator or area. In particular, when the RAT in which the user equipment is registered changes (e.g. from E-UTRAN to UTRAN, or from UTRAN to E-UTRAN), it may be required to update the WLAN offloadability information.

Figure 10:
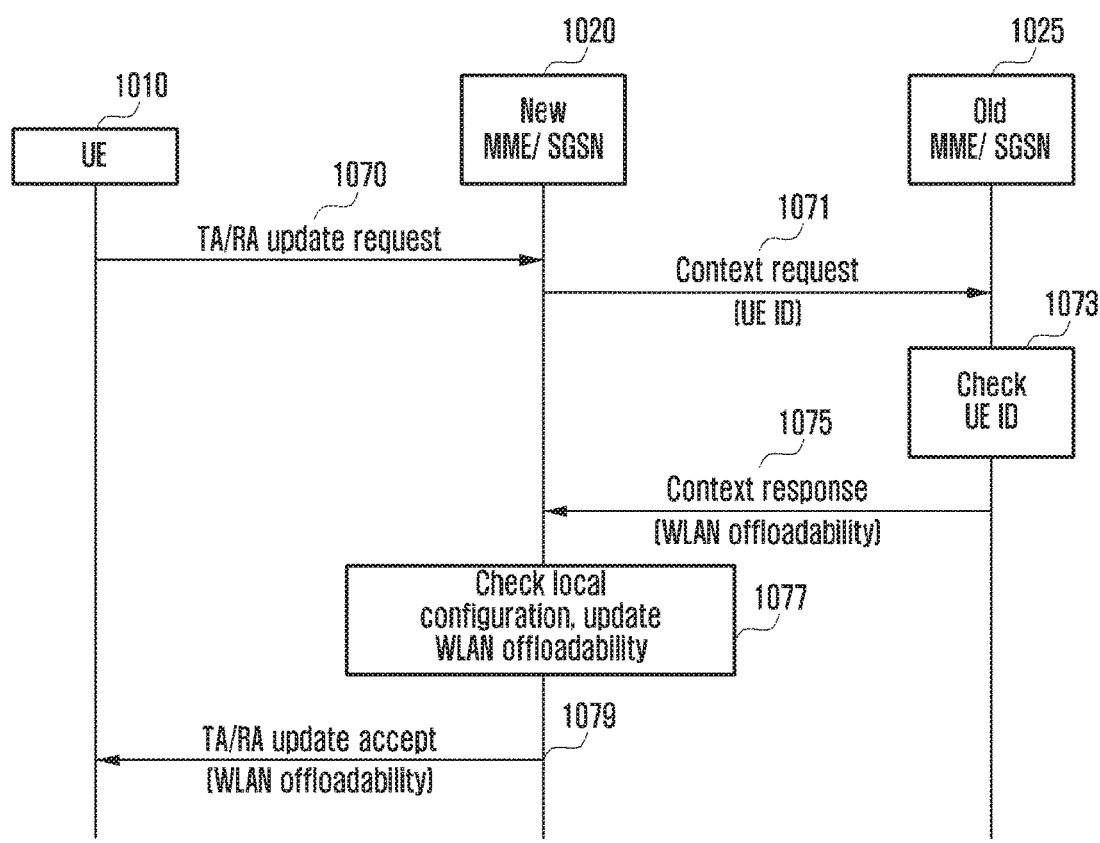
FIG. 10 is a sequence diagram depicting a procedure for notifying whether to permit WLAN offloading when the user equipment newly performs location registration or changes its RAT.

FIG. 10 is a sequence diagram depicting a procedure for notifying whether to permit WLAN offloading when the user equipment newly performs location registration or changes its RAT.

Referring to FIG. 10, at step 1070, the UE 1010 sends a TA update request message (for E-UTRAN) or RA update request message (for UTRAN or GERAN) to the new MME or SGSN 1020.

The new MME/SGSN 1020 may identify the old MME or SGSN 1025 in which the UE 1010 was previously registered on the basis of the UE identifier or core network node identifier provided by the UE 1010. At step 1071, the new MME/SGSN 1020 sends a message requesting information on the UE 1010 (e.g. context request message) to the old MME/SGSN 1025.

At step 1075, the old MME/SGSN 1025 sends a response message containing UE context information for the UE 1010 to the new MME/SGSN 1020. This message may be a context response message. The context response message may contain WLAN offloadability information indicating offloadability of the PDN connection associated with the UE 1010 to a WLAN.

More specifically, the context response message sent by the old MME/SGSN 1025 to the new MME/SGSN 1020 may have a PDN connection information element (IE), which may then include a WLAN offloadability IE indicating offloadability or non-offloadability of individual PDN connections constituting the UE contexts or PDN contexts associated with the UE 1010. The context response message may contain information indicating whether each existing PDN connection associated with the UE 1010 is WLAN offloadable by Access Point Name (APN) in addition to WLAN offloadability of each PDN connection. This information may be a portion of the UE context or subscription data for the UE 1010.

Upon reception of the context response message from the old MME/SGSN 1025, at step 1077, the new MME/SGSN 1020 identifies WLAN offloadability of current PDN connections associated with the UE 1010 and WLAN offloadability thereof by APN. The new MME/SGSN 1020 may update this WLAN offloadability information according to the local configuration. When the information sent by the old MME/SGSN 1025 is different from the local configuration, the new MME/SGSN 1020 may update the WLAN offloadability information for the UE 1010 by giving precedence to the local configuration.

At step 1079, the new MME/SGSN 1020 sends a TA update accept message or RA update accept message to the UE 1010. This message may contain updated WLAN offloadability information of PDN connections associated with the UE 1010.

More specifically, the new MME/SGSN 1020 may send the UE 1010 a TA update accept message or RA update accept message containing WLAN offloadability information by default EPS bearer ID for PDN connections.

Upon reception of the TA update accept message or RA update accept message from the new MME/SGSN 1020, when updated WLAN offloadability information is contained, the UE 1010 has to update the stored information in accordance with the updated WLAN offloadability information.

Meanwhile, when there is a need for updating the WLAN offloadability information during the TA/RA update procedure, the new MME/SGSN 1020 may initiate separately a session management (SM) procedure to notify this to the user equipment without sending a TA/RA update accept message.

Figure 11:
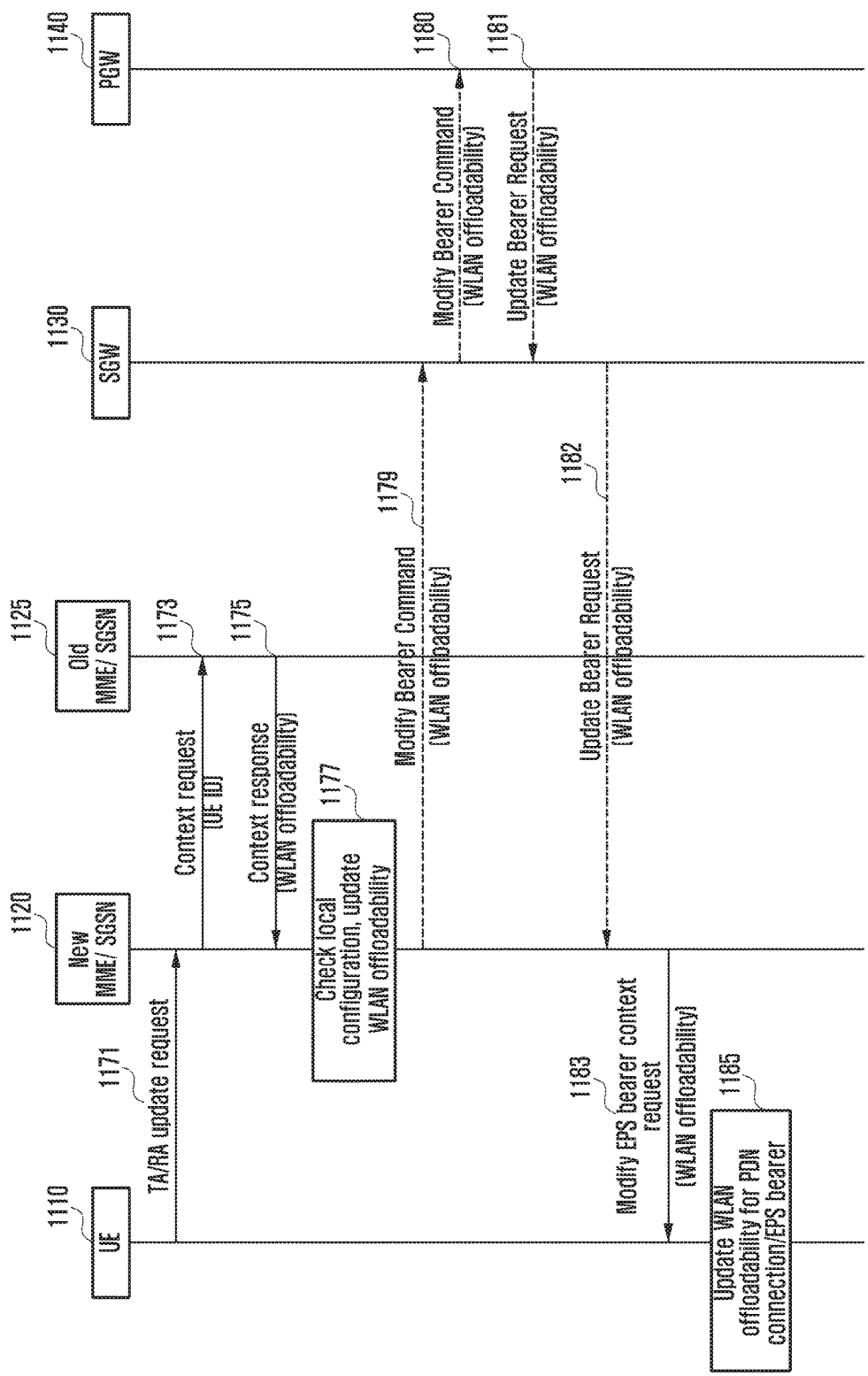
FIG. 11 is a sequence diagram depicting a procedure to update WLAN offloadability for the user equipment according to an embodiment of the present invention.

FIG. 11 is a sequence diagram depicting a procedure to update WLAN offloadability for the user equipment according to an embodiment of the present invention.

Referring to FIG. 11, at step 1171, the UE 1110 sends a TA update request message (for E-UTRAN) or RA update request message (for UTRAN or GERAN) to the new MME or SGSN 1120.

The new MME/SGSN 1120 may identify the old MME or SGSN 1125 in which the UE 1110 was previously registered on the basis of the UE identifier or core network node identifier provided by the UE 1110. At step 1173, the new MME/SGSN 1120 sends a message requesting information on the UE 1110 (e.g. context request message) to the old MME/SGSN 1125.

At step 1175, the old MME/SGSN 1125 sends a response message containing UE context information for the UE 1110 to the new MME/SGSN 1120. This message may be a context response message. The context response message may contain WLAN offloadability information indicating offloadability of the PDN connection associated with the UE 1110 to a WLAN.

More specifically, the context response message sent by the old MME/SGSN 1125 to the new MME/SGSN 1120 may have a PDN connection IE, which may then include a WLAN offloadability IE indicating offloadability or non-offloadability of individual PDN connections constituting the UE contexts or PDN contexts associated with the UE

1110. The context response message may contain information indicating whether each existing PDN connection associated with the UE 1110 is WLAN offloadable by APN in addition to WLAN offloadability of each PDN connection. This information may be a portion of the UE context or subscription data for the UE 1110.

Upon reception of the context response message from the old MME/SGSN 1125, at step 1177, the new MME/SGSN 1120 identifies WLAN offloadability of current PDN connections associated with the UE 1110 and WLAN offloadability thereof by APN. The new MME/SGSN 1120 may update this WLAN offloadability information according to the local configuration. When the information sent by the old MME/SGSN 1125 is different from the local configuration, the new MME/SGSN 1120 may update the WLAN offloadability information for the UE 1110 by giving precedence to the local configuration.

Thereafter, the new MME/SGSN 1120 may initiate a procedure for updating the WLAN offloadability information of the UE 1110. At step 1179, the new MME/SGSN 1120 sends a message for modifying bearer information for the UE 1110 (e.g. modify bearer command message) to the SGW 1130. This message may contain WLAN offloadability information of a target bearer for the UE 1110. The WLAN offloadability information may be contained as a bearer context. When multiple PDN connections are associated with the UE 1110 or when two or more EPS bearers are included in one PDN connection, the new MME/SGSN 1120 may insert the WLAN offloadability information in the message as default bearer information of the target PDN connection.

Upon reception of the modify bearer command message from the new MME/SGSN 1120, at step 1180, the SGW 1130 forwards the received information to the PGW 1140. Here, the modify bearer command message received at step 1179 may be forwarded to the PGW 1140.

At step 1181, the PGW 1140 sends an update bearer request message to the SGW 1130. This message may include WLAN offloadability information for the target PDN connection or EPS bearer.

At step 1182, the SGW 1130 forwards the update bearer request message to the new MME/SGSN 1120.

At step 1183, the new MME/SGSN 1120 sends the UE 1110 a session management (SM) message to update the WLAN offloadability information. This message may be a modify EPS bearer context request message or a modify PDP context request message, and may contain WLAN offloadability information for the target bearer. When multiple PDN connections are associated with the UE 1110 or when two or more EPS bearers are included in one PDN connection, the new MME/SGSN 1120 may send the above message for the default bearer (representative EPS bearer) of the target PDN connection. Hence, the above message may contain the identifier of the default EPS bearer. The WLAN offloadability information may be inserted in the new QoS IE of the message or separately in the WLAN offloadability IE thereof. The new MME/SGSN 1120 may perform this procedure without signaling exchange with the SGW 1130 or the PGW 1140.

In a variant embodiment, to update the WLAN offloadability information, the new MME/SGSN 1120 may send an ESM status message or ESM information message to the UE 1110. This message may contain WLAN offloadability information for the target bearer. When multiple PDN connections are associated with the UE 1110 or when two or more EPS bearers are included in one PDN connection, the new MME/SGSN 1120 may send the above message for the default bearer (representative EPS bearer) of the target PDN connection. Hence, the above message may contain the identifier of the default EPS bearer. The WLAN offloadability information may be inserted in the new QoS IE of the message or separately in the WLAN offloadability IE thereof. The new MME/SGSN 1120 may perform this procedure without signaling exchange with the SGW 1130 or the PGW 1140.

Upon reception of the SM message from the new MME/SGSN 1120, when updated WLAN offloadability information is contained, at step 1185, the UE 1110 has to update the stored information in accordance with the updated WLAN offloadability information.

Meanwhile, when the E-UTRAN and the UTRAN coexist in the operator network, the functionality or configuration for WLAN offloading may differ between the E-UTRAN and the UTRAN. For example, the E-UTRAN may support WLAN offloading while the UTRAN does not support WLAN offloading. In this case, when a user equipment moves between the E-UTRAN and the UTRAN (i.e. the RAT switches between the E-UTRAN and the UTRAN), it is necessary to newly update WLAN offloadability information for the PDN connection (or PDP context) associated with the user equipment.

Hence, to determine whether to apply idle mode signaling reduction (ISR) to a user equipment, it is necessary to consider whether the user equipment wishes to use WLAN offloading and whether the E-UTRAN or the UTRAN supports WLAN offloading. Upon reception of an attach request message or TA/RA update request message from a user equipment, the MME/SGSN has to determine whether to apply ISR to the user equipment. During this procedure, the MME (or SGSN) may send a context related message (context request, context response, or context response acknowledgement) containing information indicating whether the corresponding network supports WLAN offloading to the SGSN (or MME); and, as a reply, the SGSN (or MME) may send a context related message containing information indicating whether the corresponding network supports WLAN offloading to the MME (or SGSN).

ISR may be initiated for the user equipment only when the two networks are identical in terms of supportability of WLAN offloading. A context exchange message may be used to verify a coincidence of supportability of WLAN offloading between the two networks. That is, in the above example, upon reception of the context response message from the MME (or SGSN), the SGSN (or MME) may apply ISR only when supportability of WLAN offloading of the MME (or SGSN) indicated by the message matches that of the SGSN (or MME), and may determine whether to insert an ISR supported/activated indicator in the context response acknowledgement message correspondingly. When the two networks are not identical in terms of supportability of WLAN offloading, or when the coincidence of supportability of WLAN offloading between the two networks cannot be verified, ISR may not be activated for the user equipment.

Figure 12:
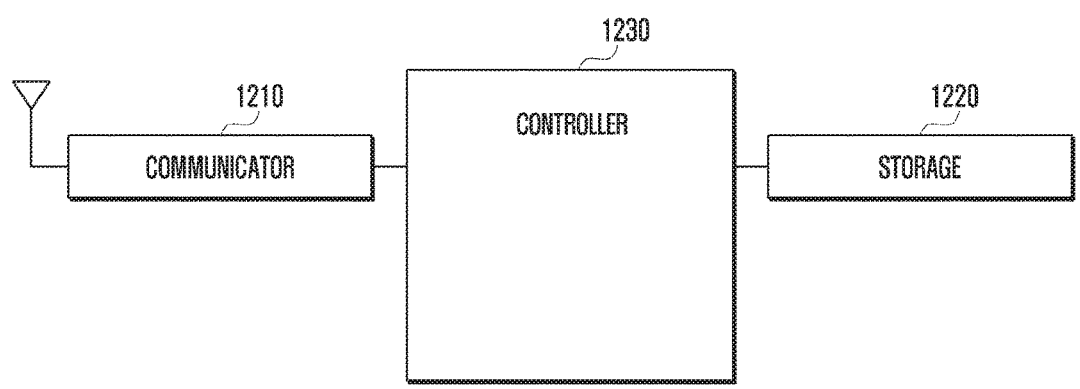
FIG. 12 is a block diagram of a mobility management entity (MME) according to an embodiment of the present invention.

FIG. 12 is a block diagram of a mobility management entity (MME) according to an embodiment of the present invention.

Referring to FIG. 12, the MME may include a communicator 1210 and a controller 1230 to control the overall operation thereof. The MME may further include storage 1220.

The storage 1220 may store programs and data needed for operation of the MME.

The controller 1230 of the MME may control the MME to perform operations according to one of the embodiments described before. For example, the controller 1230 may control a process of receiving, from a user equipment, a power saving mode request message containing information requesting a network entity to perform proxy transmission and reception for the user equipment in power saving mode, sending information indicating availability of power saving mode and corresponding parameters to the user equipment, and sending information requesting a network entity to perform proxy transmission and reception for the user equipment during power saving mode to the home subscriber server (HSS).

The communicator 1210 may send and receive signals according to one of the embodiments described before.

Figure 13:
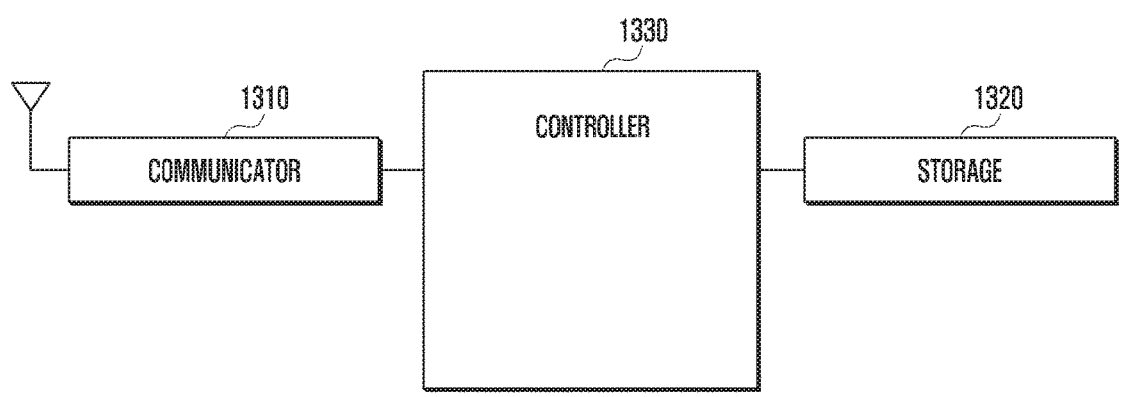
FIG. 13 is a block diagram of a user equipment according to an embodiment of the present invention.

FIG. 13 is a block diagram of a user equipment according to an embodiment of the present invention.

Referring to FIG. 13, the UE may include a communicator 1310 and a controller 1330 to control the overall operation thereof. The UE may further include storage 1320.

The storage 1320 may store programs and data needed for operation of the UE.

The controller 1330 of the UE may control the UE to perform operations according to one of the embodiments described before. For example, the controller 1330 may control a process of sending a power saving mode request message containing information requesting a network entity to perform proxy transmission and reception for the user equipment during power saving mode to the mobility management entity (MME), receiving information indicating availability of power saving mode and corresponding parameters from the MME, and operating in power saving mode according to the received parameters.

The communicator 1310 may send and receive signals according to one of the embodiments described before.

Although not shown, according to an embodiment of the present invention, a service capability server (SCS) may include a communicator to send and receive signals according to one of the embodiments described before, and a controller to control the overall operation of the SCS. The SCS may further include storage to store programs and data needed for operation of the SCS.

According to an embodiment of the present invention, a base station (ENB) may include a communicator to send and receive signals according to one of the embodiments described before, and a controller to control the overall operation of the ENB. The ENB may further include storage to store programs and data needed for operation of the ENB.

According to an embodiment of the present invention, a network entity may include a controller to control the overall operation of the network entity, and a communicator to communicate with another network entity. The network entity may further include storage to store programs and data needed for operation thereof.

A step or message in the above embodiments may be selectively performed or skipped. Steps in the above embodiments may be performed in a sequence different from that listed therein (e.g. in reverse or in parallel). Messages in the above embodiments may be sent in a sequence different from that listed therein (e.g. in reverse or in parallel). A step or message in the above embodiments may be performed or transmitted in an independent manner.

Hereinabove, exemplary embodiments of the present invention have been described with reference to the accompanying drawings for the purpose of illustration without limiting the subject matter of the present invention. The phraseology and terminology used herein is for the purpose of description and should not be regarded as limiting. It is also to be appreciated that the present invention may be embodied in many different forms.

Accordingly, it should be understood by those skilled in the art that many variations and modifications of the basic inventive concept described herein will still fall within the spirit and scope of the present invention as defined in the appended claims and their equivalents.

The invention claimed is:

1. A method by a user equipment (UE) for communicating, the method comprising:
transmitting, to a mobility management entity (MME), a first message for requesting an operation in a power saving mode and for requesting transmission and reception of a message for the UE by a network entity in case that the UE operates in the power saving mode;
receiving, from the MME, a second message including information indicating availability of the power saving mode and at least one parameter for the power saving mode, based on the first message;
transmitting, to the network entity, a third message including information on a timer and information for requesting the transmission and reception of the message instead of the UE in case that the timer is expired; and
operating in the power saving mode based on the second message.

2. The method of claim 1, wherein the first message includes information regarding at least one of a duration of the power saving mode of the UE, an active timer, and an active flag.

3. The method of claim 1,
wherein the third message further includes at least one of information indicating that the UE operates in the power saving mode, information indicating a duration of the power saving mode of the UE, and information indicating a radio access technology (RAT) to which the UE is connected.

4. The method of claim 1, further comprising:
transmitting, to the network entity, a fourth message including information on an external identity (ID) of the UE,
wherein, the external ID of the UE is stored by the network entity, and if a fifth message is received by the network entity from a server, the network entity compares the external ID of the UE with an address of the fifth message, and, if the external ID of the UE corresponds to the address of the fifth message, a response message is transmitted by the network entity to the server.

5. A method by a mobility management entity (MME) for communicating, the method comprising:
receiving, from a user equipment (UE), a first message for requesting an operation in a power saving mode and for requesting transmission and reception of a message for the UE by a network entity if the UE operates in the power saving mode;
transmitting, to the UE, a second message including information indicating availability of the power saving mode and at least one parameter for the power saving mode, based on the first message; and
transmitting, to a home subscriber server (HSS), information for requesting the network entity to transmit and receive for the UE, if the UE operates in the power saving mode,
wherein a third message including information on a timer and information for requesting the transmission and reception of the message instead of the UE in case that the timer is expired is transmitted from the UE to the network entity.

6. The method of claim 5, wherein the first message includes information regarding at least one of a duration of the power saving mode of the UE, an active timer, and an active flag.

7. A method by a service capability server (SCS) for communicating, the method comprising:
  receiving, from a user equipment (UE), a first message including information on a timer and information for requesting transmission and reception of a message instead of the UE in case that the timer is expired, if the UE operates in a power saving mode; and
  transmitting and receiving the message for the UE to and from a server, if the UE operates in the power saving mode.

8. The method of claim 7, further comprising:
  receiving, from the UE, a second message including information on an external identity (ID) of the UE;
  storing the external ID of the UE;
  comparing, if a third message is received from a server, the external ID of the UE with an address of the third message; and
  transmitting, to the server, a response message, if the external ID of the UE corresponds to the address of the third message.

9. A user equipment (UE) comprising:
  a communicator; and
  a controller coupled with the communicator and configured to:
    control the communicator to transmit, to a mobility management entity (MME), a first message for requesting an operation in a power saving mode and for requesting transmission and reception of a message for the UE by a network entity in case that the UE operates in the power saving mode,
    control the communicator to receive, from the MME, a second message including information indicating availability of the power saving mode and at least one parameter for the power saving mode, based on the first message,
    control the communicator to transmit, to the network entity, a third message including information on a timer and information for requesting the transmission and reception of the message instead of the UE in case that the timer is expired, and
    operate in the power saving mode based on the second message.

10. The user equipment of claim 9, wherein the first message includes information regarding at least one of a duration of the power saving mode of the UE, an active timer, and an active flag.

11. The user equipment of claim 9, wherein the third message further includes at least one of information indicating that the UE operates in the power saving mode, information indicating a duration of the power saving mode of the UE, and information indicating a radio access technology (RAT) to which the UE is connected.

12. The user equipment of claim 9,
  wherein the controller is further configured to:
    control the communicator to transmit, to the network entity, a fourth message including information on an external identity (ID) of the UE, and
  wherein, the external ID of the UE is stored by the network entity, and if a fifth message is received by the network entity from a server, the network entity compares the external ID of the UE with an address of the fifth message, and, if the external ID of the UE corresponds to the address of the fifth message, a response message is transmitted by the network entity to the server.

13. A mobility management entity (MME) comprising:
  a communicator; and
  a controller coupled with the communicator and configured to control the communicator to:
    receive, from a user equipment (UE), a first message for requesting an operation in a power saving mode and for requesting transmission and reception of a message for the UE by a network entity if the UE operates in the power saving mode,
    transmit, to the UE, a second message including information indicating availability of the power saving mode and at least one parameter for the power saving mode, based on the first message, and
    transmit, to a home subscriber server (HSS), information for requesting the network entity to transmit and receive for the UE, if the UE operates in the power saving mode,
  wherein a third message including information on a timer and information for requesting the transmission and reception of the message instead of the UE in case that the timer is expired is transmitted from the UE to the network entity.

14. The mobility management entity of claim 13, wherein the first message includes information regarding at least one of a duration of the power saving mode of the UE, an active timer, and an active flag.

15. A service capability server (SCS) comprising:
  a communicator; and
  a controller coupled with the communicator and configured to control the communicator to:
    receive, from a user equipment (UE), a first message including information on a timer and information for requesting transmission and reception of a message instead of the UE in case that the timer is expired, if the UE operates in a power saving mode, and
    transmit and receive the message for the UE to and from a server, if the UE operates in the power saving mode.

16. The service capability server of claim 15, wherein the controller is further configured to:
  control the communicator to receive, from the UE, a second message including information on an external identity (ID) of the UE,
  store the external ID of the UE,
  compare, if a third message is received from a server, the external ID of the UE with an address of the third message, and
  control the communicator to transmit, to the server, a response message, if the external ID of the UE corresponds to the address of the third message.

* * * * *